United States Patent
Takamine et al.

(10) Patent No.: US 6,567,372 B2
(45) Date of Patent: *May 20, 2003

(54) OPTICAL DISK AND OPTICAL DISK APPARATUS WITH TRACKS AND GROOVES

(75) Inventors: Kouichi Takamine, Hyogo (JP); Shin-ichi Yamada, Osaka (JP); Takashi Ishida, Kyoto (JP); Atsushi Nakamura, Osaka (JP); Seiji Nishiwaki, Osaka (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/435,126

(22) Filed: Jul. 14, 1999

(65) Prior Publication Data

US 2002/0126591 A1 Sep. 12, 2002

(30) Foreign Application Priority Data

Jul. 15, 1998 (JP) ............................................. 10-200006

(51) Int. Cl.⁷ ................................................. G11B 7/24
(52) U.S. Cl. ................. 369/275.4; 369/275.3
(58) Field of Search .......................... 369/275.3, 275.4, 369/275.1, 13, 124, 278, 44.26, 109, 110, 111, 277, 44.41, 44.42, 44.29, 44.24

(56) References Cited

U.S. PATENT DOCUMENTS

| | | | | |
|---|---|---|---|---|
| 5,508,995 A | * | 4/1996 | Moriya et al. ............ | 369/275.4 |
| 5,805,565 A | * | 9/1998 | Miyamoto et al. ........ | 369/275.4 |
| 5,898,663 A | * | 4/1999 | Miyamoto et al. ........ | 369/275.4 |
| 5,933,410 A | * | 8/1999 | Nakane et al. | |
| 5,942,001 A | | 8/1999 | Tanoue et al. | |

FOREIGN PATENT DOCUMENTS

| | | | |
|---|---|---|---|
| DE | 4304267 | | 8/1993 |
| EP | 0249106 | | 12/1987 |
| EP | 0664541 | | 7/1995 |
| EP | 0752701 | | 1/1997 |
| EP | 0757343 | * | 2/1997 |
| EP | 0817191 | | 1/1998 |
| GB | 2307770 | | 6/1997 |

* cited by examiner

*Primary Examiner*—Ali Neyzari
(74) *Attorney, Agent, or Firm*—RatnerPrestia

(57) ABSTRACT

An optical disk includes tracks and grooves, the grooves being formed with a pitch equal to or greater than about $\lambda/NA$. A first array of pits is provided at a position which is shifted by a predetermined amount with respect to each track in one of two directions substantially perpendicular to the tracks, the first array of pits being formed with a predetermined pitch, where the predetermined pitch is a function of a pitch of the grooves taking a value within a range from about 0 to about $\lambda/NA$. A second array of pits is provided at a position which is shifted by a predetermined amount with respect to the track in the other one of the two directions substantially perpendicular to the tracks, the second array of pits being formed with a predetermined pitch, where the predetermined pitch is a function of the pitch of the grooves taking a value within the range from about 0 to about $\lambda/NA$. $\lambda$ is a wavelength of a light beam which is radiated on the optical disk, and NA to a numerical aperture of a lens.

31 Claims, 20 Drawing Sheets

High-band tracking error signal (RFTE)

Digitized signal of RFTE peaks

Digitized signal of RFTE bottoms

IDGATE

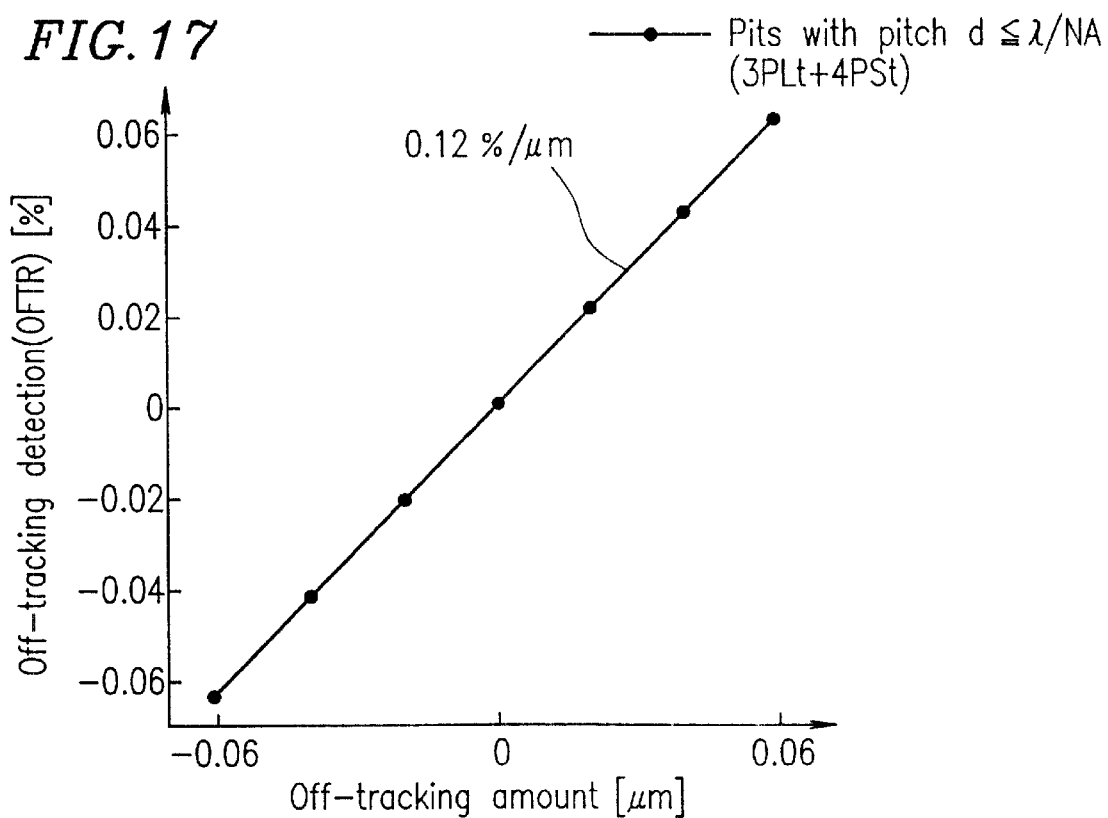

OPTICAL DISK AND OPTICAL DISK APPARATUS WITH TRACKS AND GROOVES

BACKGROUND OF THE INVENTION

1. Field of the Invention

The present invention relates to an optical disk and to an optical disk apparatus which is capable of detecting off-tracking based on a reproduction signal from the optical disk and compensating for the off-tracking.

2. Description of the Related Art

Optical disks such as compact optical disks (CDs) and digital video (or versatile) disks (DVDs) are used as information recording media for recording data, images, and/or sounds, and are widely utilized in OA (office automation) apparatuses, AV (audio visual) apparatuses, and the like. In the field of large-capacity rewritable optical disks, one attempt to realize increased surface capacity has been to allow information to be recorded in both "grooves" (i.e., concave portions formed by guide grooves of spiral tracks) and "lands" (i.e., interspaces between "grooves") so that the information recorded in the grooves and lands can be reproduced.

There is a class of optical disks, called single spiral land groove format (hereinafter referred to as SS-L/GFMT) optical disks, which are capable of consecutively reproducing or recording the information on the lands and the grooves from the inner periphery to the outer periphery of the optical disks, in which the lands and the grooves are provided so as to alternate per rotation of the optical disks.

On the other hand, an optical disk apparatus is generally arranged so as to be capable of reproducing or recording information on an optical disk. An optical disk apparatus usually generates a tracking error signal from a light beam which is radiated on an optical disk and reflected therefrom, by using a known push-pull method or the like. A tracking error signal indicates the state of shift or offset of a light beam which is radiated on an optical disk, with respect to the center of a target track on the optical disk. Based on the generated tracking error signal, an optical disk apparatus performs tracking control by controlling the converged light beam to follow a given target track on the optical disk.

Hereinafter, a conventional SS-L/GFMT disk will be described.

FIGS. 19A to 19C schematically show the structure of a conventional SS-L/GFMT disk. FIG. 19A illustrates a single spiral structure. As shown in FIG. 19A, a single spiral optical disk is constructed by forming land tracks and groove tracks so as to alternate at a L/G (land/groove) switching point per rotation of the optical disk.

FIG. 19B is an enlarged view showing a L/G switching point. As shown in FIG. 19B, a track on an optical disk is constructed of a data region and an address region which indicates a physical location on the optical disk. An address region includes first and second address pit arrays as well as third and fourth address pit arrays. At a L/G switching point, the first and second address pit arrays are disposed so as to be shifted from the end of each groove track toward the inner periphery side by 1/2 of the track pitch. Conversely, in address regions which do not correspond to L/G switching points, the first and second address pit arrays are disposed so as to be shifted from the end of each groove track toward the outer periphery side by 1/2 of the track pitch.

The third and fourth address pit arrays are disposed so as to be shifted from the beginning of each groove track toward the inner periphery side by 1/2 of the track pitch, in all address regions, whether they correspond to L/G switching points or not.

FIG. 19C is a further enlarged view of the vicinity of an address region which does not correspond to a L/G switching point. As shown in FIG. 19C, each data region is constructed of tracks, groove or land, which meander with respect to the direction of rotation of the optical disk. As explained with reference to FIG. 19B, the first address pit array and the second address pit array are disposed so as to be shifted from the end of each groove track toward the outer periphery side by 1/2 of the track pitch, and the third and fourth address pit arrays are disposed so as to be shifted from the beginning of each groove track toward the inner periphery side by 1/2 of the track pitch.

However, a conventional SS-L/GFMT disk and a conventional optical disk apparatus for reproducing and/or recording information on a conventional SS-L/GFMT disk have the following problems.

The principle of detecting a tracking error signal from a light beam which is converged and radiated on a conventional SS-L/GFMT disk by using a known push-pull method will be described.

FIGS. 20A and 20B illustrate the relationship between a tracking error signal obtained when a light beam crosses a track on an optical disk and an offset of the light beam with respect to the optical disk surface (hereinafter referred to as the "optical disk tilt"). Specifically, FIG. 20A illustrates a tracking error signal which is obtained when a light beam crosses a track with zero radial tilt and a tracking error signal which is obtained when a light beam crosses a track with a radial tilt of 1.0 degree, shown against a cross section of an optical disk having land tracks and groove tracks. It is assumed that the tracks extend in a direction which is perpendicular to the plane of FIG. 20A. FIG. 20B is a graph illustrating the relationship between the optical disk tilt along the radial direction and an offset of a light beam from a track center (hereinafter referred to as "off-tracking"), where a tracking error signal indicating off-tracking of the light beam is detected and tracking control is performed so as to attain a zero value of the detected tracking error signal. As used herein, a radial tilt is defined as the tilt of an optical disk occurring along the scanning direction of a track.

As shown by the solid-line waveform in FIG. 20A, when there is no optical disk tilt, the tracking error signal indicating the position of a light beam with respect to a track has a zero value when the light beam is located on the track center. A tracking servo system of the optical disk apparatus operates so as to reduce the difference between the zero level of the tracking error signal and the reference control value to zero, thereby achieving feedback control so that the converged light beam follows the track center.

However, when the optical disk has a radial tilt, as shown by the broken-line waveform in FIG. 20A, the actual tracking center does not correspond to the zero level of the tracking error signal. On the other hand, as shown in FIG. 208, the off-tracking versus radial tilt characteristics are such that an optical disk tilt of a bout 1.0 degrees along the radial direction results in an off-tracking of about 0.104 $\mu$m. Accordingly, there is a problem in that under the presence of an optical disk tilt of about 1.0 degrees, an off-tracking of about 0.104 $\mu$m may result even if the tracking servo functions successfully.

SUMMARY OF THE INVENTION

An optical disk according to the present invention includes tracks and grooves, the grooves being formed with a pitch equal to or greater than about λ/NA, wherein a first array of pits is provided at a position which is shifted by a predetermined amount with respect to each track in one of two directions substantially perpendicular to the tracks, the first array of pits being formed with a predetermined pitch, where the predetermined pitch is a function of a pitch of the grooves taking a value within a range from about 0 to about λ/NA, wherein a second array of pits is provided at a position which is shifted by a predetermined amount with respect to the track in the other one of the two directions substantially perpendicular to the tracks, the second array of pits being formed with a predetermined pitch, where the predetermined pitch is a function of the pitch of the grooves taking a value within the range from about 0 to about λ/NA, wherein λ is a wavelength of a light beam which is radiated on the optical disk; and NA is a numerical aperture of a lens.

In one embodiment of the invention, the first array of pits and the second array of pits are provided between an address region and a data region, the address region being used for recording information indicating one of the tracks on the optical disk, and the data region being used for recording data.

In another embodiment of the invention, the optical disk includes: a first address region formed at a position which is shifted by a predetermined amount with respect to each track in the one of the two directions substantially perpendicular to the tracks, location information of one of the tracks being recorded in the first address region; and a second address region formed at a position which is shifted by a predetermined amount with respect to each track in the other one of the two directions substantially perpendicular to the tracks, the first address region and the second address region each including a PLL synchronization region for generating a reproduction clock, and the first array of pits is provided in the PLL synchronization region in the first address region; and the second array of pits is provided in the PLL synchronization region in the second address region.

In still another embodiment of the invention, each pit in the first array of pits has a shape which is substantially identical with a shape of each pit in the second array of pits.

In still another embodiment of the invention, a reproduction time of a pit in the first array of pits is n times as large as a reproduction clock cycle; a reproduction time of a pit in the second array of pits is n times as large as the reproduction clock cycle; a reproduction time of a space between adjoining pits in the first array of pits is m times as large as the reproduction clock cycle; and a reproduction time of a space between adjoining pits in the second array of pits is m times as large as the reproduction clock cycle, where n and m are natural numbers.

In still another embodiment of the invention, n is 3 and m is 4.

In still another embodiment of the invention, n is 4 and m is 3.

In still another embodiment of the invention, the predetermined pitch of the first array of pits is in the range of about 0.96 μm to about 1.035 μm; the predetermined pitch of the second array of pits is in the range of about 0.96 μm to about 1.035 μm; λ is about 660 nm; and NA is about 0.6.

In still another embodiment of the invention, the predetermined pitch of the first array of pits is in the range of about 0.61 μm to about 0.667 μm: the predetermined pitch of the second array of pits is in the range of about 0.61 μm to about 0.667 μm; λ is about 425 nm; and NA is about 0.6.

In still another embodiment of the invention, the pitch of the grooves is in the range of about λ/NA to about λ/NA× 1.9.

In another aspect of the invention, there is provided an optical disk apparatus including: a reproduction signal generation section for converging a light beam on an optical disk to reproduce information recorded on the optical disk, the optical disk including tracks and grooves, the grooves being formed with a pitch equal to or greater than about λ/NA, wherein a first array of pits is provided at a position which is shifted by a predetermined amount with respect to each track in one of two directions substantially perpendicular to the tracks, the first array of pits being formed with a predetermined pitch, where the predetermined pitch is a function of a pitch of the grooves taking a value within a range from about 0 to about λ/NA, wherein a second array of pits is provided at a position which is shifted by a predetermined amount with respect to the track in the other one of the two directions substantially perpendicular to the tracks, the second array of pits being formed with a predetermined pitch, where the predetermined pitch is a function of the pitch of the grooves taking a value within the range from about 0 to about λ/NA. The optical disk apparatus further includes an off-tracking detection section for detecting an offset between the light beam and a center of the track, based on, among the information reproduced by the reproduction signal generation section, information concerning the first array of pits and the second array of pits; wherein λ is a wavelength of a light beam which is radiated on the optical disk; and NA is a numerical aperture of a lens.

In one embodiment of the invention, the optical disk apparatus further includes a tracking servo section for controlling the light beam so as to follow the track based on a tracking error signal indicating the offset between the light beam and the center of the track, and, based on the offset between the light beam and the center of the track as detected by the off-tracking detection section, the tracking servo section changes a target position of the light beam so that the light beam is located substantially at the center of the track.

In another embodiment of the invention, the information concerning the first array of pits and the second array of pits is an amplitude of a reproduction signal from the first array of pits and an amplitude of a reproduction signal from the second array of pits as detected by the reproduction signal generation section, and the off-tracking detection section detects the offset between the light beam and the center of the track based on a difference between the amplitude of the reproduction signal from the first array of pits and the amplitude of the reproduction signal from the second array of pits.

In still another embodiment of the invention, the off-tracking detection section calculates an amplitude based on a difference between a value representing a peak envelope and a value representing a bottom envelope of a reproduction signal generated by the reproduction signal generation section, and the off-tracking detection section calculates a difference between an amplitude of a reproduction signal obtained by scanning the first array of pits with the light beam and an amplitude of a reproduction signal obtained by scanning the second array of pits with the light beam.

In still another embodiment of the invention, the off-tracking detection section calculates a peak envelope detection value difference and a bottom envelope detection value difference, the peak envelope detection value difference being defined as a difference between a value representing a peak envelope of a reproduction signal obtained by scanning the first array of pits with the light beam and a value representing a peak envelope of a reproduction signal obtained by scanning the second array of pits with the light beam, the bottom envelope detection value difference being defined as a difference between a value representing a bottom envelope of a reproduction signal obtained by scanning the first array of pits with the light beam and a value representing a bottom envelope of a reproduction signal obtained by scanning the second array of pits with the light beam, and the off-tracking detection section calculates a difference between the peak envelope detection value difference and the bottom envelope detection value difference.

In still another embodiment of the invention, the optical disk apparatus further includes an address region detection section for generating a signal indicating that the light beam is located on an address region on the optical disk, based on the reproduction signal produced by the reproduction signal generation section, wherein, based on the signal indicating that the light beam is located on the address region on the optical disk, the address region detection section generates a timing with which to detect the offset between the light beam and the center of the track while the light beam is scanning over a preceding one of the first array of pits and the second array of pits.

In still another embodiment of the invention, the optical disk apparatus further includes an address region detection section for generating a signal indicating that the light beam is located on an address region on the optical disk, based on the reproduction signal produced by the reproduction signal generation section, wherein, based on the signal indicating that the light beam is located on the address region on the optical disk, the address region detection section generates a timing with which to detect the offset between the light beam and the center of the track while the light beam is scanning over a subsequent one of the first array of pits and the second array of pits.

In still another embodiment of the invention, the off-tracking detection section detects the offset between the light beam and the center of the track by use of the light beam scanning over the first array of pits and the second array of pits, and the off-tracking detection section detects the offset holds a previously detected value until a subsequent time the light beam scans over the first array of pits and the second array of pits.

In still another embodiment of the invention, the optical disk apparatus further includes a tracking servo section for controlling the light beam so as to be located substantially at the center of the track, based on the offset detected by the off-tracking detection section.

Thus, the invention described herein makes possible the advantages of (1) providing an optical disk having a pit array which is used to ensure that a converged light beam accurately follows a track center; and (2) providing an optical disk apparatus capable of ensuring that a converged light beam accurately follows a track center.

These and other advantages of the present invention will become apparent to those skilled in the art upon reading and understanding the following detailed description with reference to the accompanying figures.

BRIEF DESCRIPTION OF THE DRAWINGS

FIG. 17 is a graph illustrating the relationship between off-tracking and an off-tracking detection signal OFTR under the conditions that λ=about 660 nm and NA=about 0.6.

DESCRIPTION OF THE PREFERRED EMBODIMENTS

An optical disk according to the present invention includes tracks and grooves, where some of the tracks are defined by the grooves, in such a manner that the grooves are formed with a pitch equal to or greater than about λ/NA. A first array of pits are provided at a position which is shifted by a predetermined radial amount with respect to each track in one of two directions substantially perpendicular to the tracks. The first array of pits are formed with a predetermined pitch along the circumferential direction, where the predetermined pitch is a function of the pitch of the grooves taking a value within a range from about 0 to about λ/NA. A second array of pits are provided at a position which is shifted by a predetermined radial amount with respect to the track in the other direction which is substantially perpendicular to the tracks. The second array of pits are formed with a predetermined pitch along the circumferential direction, where the predetermined pitch is a function of the pitch of the grooves taking a value within the range from about 0 to about λ/NA. λ is the wavelength of a light beam which is radiated on the optical disk, and NA is the numerical aperture of an objective lens used for converging the light beam on the optical disk.

An optical disk apparatus according to the present invention detects and compensates for the offset (hereinafter referred to as "off-tracking") of a light beam converged on the optical disk with respect to the center of a track on which the light beam is converged, based on a difference in amplitude between the reproduction signals from the first and second pit arrays.

The inventors have found that the amplitudes of the respective reproduction signals from the first and second pit arrays, which are formed with a predetermined pitch which is equal to or smaller than about λ/NA, always become equal at a track center, irrespective of any possible radial tilt. This is presumably because the intensity variation of a diffracted image under the presence of a radial tilt becomes negligible in the case where the pit arrays are formed with a pitch as small as about λ/NA or less.

Hereinafter, an optical disk according to one embodiment of the present invention including pits which are formed with a predetermined pitch equal to or smaller than about λ/NA, and an optical disk apparatus capable of detecting and compensating for the off-tracking of a light beam converged on the optical disk based on the reproduction signals from the pits formed with a predetermined pitch of about λ/NA or less, will be specifically described with reference to the accompanying drawings.

Figure 1:
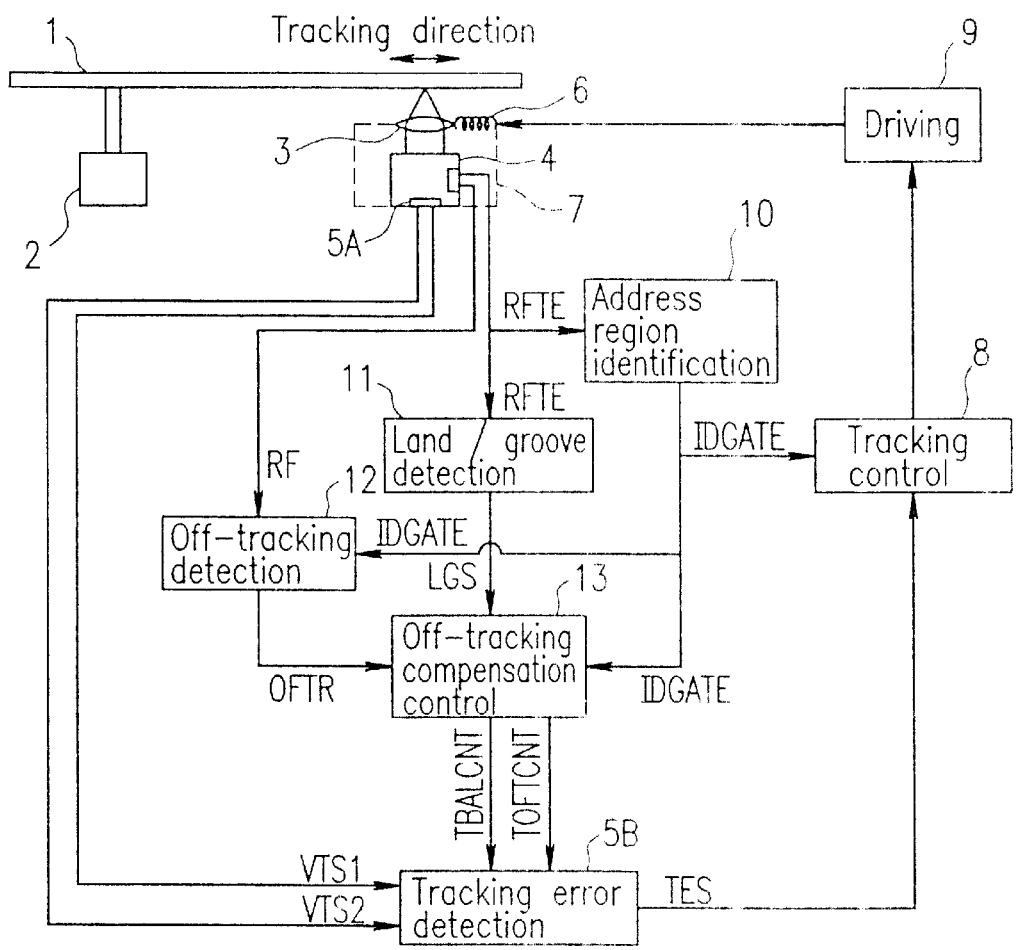
FIG. 1 is a block diagram illustrating an optical disk apparatus according to an example of the invention.

First, an optical disk apparatus according to a first example of the invention will be specifically described which is capable of detecting and compensating for the off-tracking of a light beam converged on an optical disk based on the reproduction signals from pits formed with a predetermined pitch of about λ/NA or less. FIG. 1 is a block diagram illustrating the optical disk apparatus according to the first example of the invention.

With reference to FIG. 1, an optical disk 1, having an array of pits which are formed with a predetermined pitch of about λ/NA or less, is mounted on a spindle motor 2. An optical head 7 includes a semiconductor laser (not shown), an objective lens 3, an optical detector 5A, a reproduction signal detector 4, a tracking actuator 6, a focus actuator (not shown), a focus error detector (not shown), and other elements. A light beam which is emitted from the semiconductor laser is led through an optical system (not shown) so as to be converged by the objective lens 3 onto the optical disk 1.

The light beam which is reflected from the optical disk 1 is led back through the objective lens 3 and the optical system so as to enter the optical detector 5A, the reproduction signal detector 4, the focus error detector, and the like.

The focus error detector (not shown) detects a focus error signal (FES) which indicates the shift of the light beam converged on the optical disk 1 with respect to a predetermined convergence state. The detection of the FES is performed by a known focus error detection method such as an astigmatic method.

The optical detector 5A outputs voltage signals VTS1 and VTS2 to be used for generating a tracking error signal TES representing the detected off-tracking of the light beam converged on the optical disk 1, i.e., the shift of the light beam with respect to the center of a target track on the optical disk 1. The reproduction signal detector 4 detects a reproduction signal RF representing the reflected light amount of the light beam radiated onto the optical disk 1, based on a sum of the detection signals obtained from the two respective portions (not shown) of the optical detector 5A which are split along the radius direction of the optical disk 1. In addition, the reproduction signal detector 4 detects a high-band tracking error signal (RFTE) based on a difference between the detection signals obtained from the two-split portions (not shown) of the optical detector 5A. Thus, the reproduction signal detector 4 outputs these detected signals RF and RFTE. The information which is recorded on the optical disk 1 in the form of varying reflectance can be read based on the reproduction signal RF. The tracking error detection section 5B receives the voltage signals VTS1 and VTS2 from the optical detector 5A for generating the tracking error signal TES. Thus, the tracking error detection section 5B and the optical detector 5A cooperate to detect the tracking error signal TES. The detection of the tracking error signal TES can be performed by a known tracking error detection method such as a push-pull method.

The tracking error detection section 5B changes the zero level of the tracking error signal TES, i.e., the target position of the tracking servo control, based on a tracking error detection balance control signal TBALCNT or a tracking error detection offset control signal TOFTCNT from an off-tracking compensation control section 13 (described below). The balance adjustment and the offset adjustment of the tracking error signal TES will be described in detail later.

The RFTE output signal from the reproduction signal detector 4 is a signal which contains a reproduction signal (hereinafter referred to as an "address signal") from an address section on the optical disk 1. Each address section is formed in the form of convex and/or concave address pits. The address pits on the optical disk 1 are formed at a position which is shifted by about 1/2 track pitch with respect to the center of a groove track or the center of a land track so that the address can be reproduced from the RFTE signal, which is a high-band tracking error signal obtained by passing components up to the frequency band of the address signal. Thus, an address signal and a gate signal in the address region (described later) can be obtained from the RFTE signal.

An address region identification section 10 generates the gate signal in the address region (described later). A tracking control section 8 outputs to a driving section 9 a signal which controls the error or difference between the detected position and the target position of the tracking servo control to become zero, based on the output signal TES from the tracking error detection section 5B. In accordance with an IDGATE signal from the address region identification section 10, the tracking control section 8 maintains the output signal for the driving section 9 at a value which existed before the light beam converged on the optical disk 1 entered an address region, over the entire length of the time during which the light beam passes over that address region.

The driving section 9 outputs to the tracking actuator 6 (described later) a signal that drives the tracking actuator 6 so as to change the position of the objective lens 3 along the tracking direction based on an output signal from the tracking control section 8. In accordance with the signal from the driving section 9, the tracking actuator 6 moves the objective lens 3 so that the light beam is converged an the center of a given target track on the optical disk 1.

An off-tracking detection section 12 detects a signal OFTR representing the off-tracking of the light beam converged on the optical disk 1 in accordance with the RF signal from the reproduction signal detector 4 and the IDGATE signal from the address region identification section 10, and sends the detected signal OFTR to the off-tracking compensation control section 13.

The off-tracking compensation control section 13 outputs the tracking error detection balance control signal TBALCNT, or the tracking error detection offset control signal TOFTCNT, to the tracking error detection section 5B for compulsorily moving the tracking position, and receives the off-tracking detection signal OFTR from the off-tracking detection section 12. Specifically, the tracking error detection balance control signal TBALCNT or the tracking error detection offset control signal TOFTCNT, which is output from the off-tracking compensation control section 13 to the tracking error detection section 5B, has a value which ensures that the off-tracking detection signal OFTR becomes zero. The off-tracking compensation control section 13 also receives an LGS signal from a land/groove detection section 11 (described later) and the IDGATE signal from the address region identification section 10.

Now, an optical disk including pits which are formed with a predetermined pitch equal to or smaller than $\lambda/NA$ will be described with reference to FIGS. 2A and 2B, where $\lambda$ is the wavelength of a light beam emitted from the optical head 7 (FIG. 1) and NA is the numerical aperture of the objective lens 3 (FIG. 1).

FIG. 2A is a block diagram schematically illustrating an optical disk having pits formed with a predetermined pitch which is equal to or smaller than $\lambda/NA$. FIG. 23 is a waveform diagram illustrating the reproduction signal RF, which is reproduced based on a sum of the signals detected from the pits which are formed with a predetermined pitch which is equal to or smaller than $\lambda/NA$.

As shown in FIG. 2A, a first array of pits are formed with a predetermined pitch d which is equal to or smaller than $\lambda/NA$, so as to be located at a position which is shifted from the end of a groove track toward the outer periphery side by 1/2 of the track pitch, for example. A second array of pits are formed with the predetermined pitch d which is equal to or smaller than $\lambda/NA$, so as to be located at a position which is shifted from the beginning of a groove track toward the inner periphery side by 1/2 of the track pitch, for example.

The number of pits in the first pit array is preferably two, three, or more. The number of pits in the second pit array is also preferably two, three, or more.

Now, the pits formed with a predetermined pitch d which is equal to or smaller than $\lambda/NA$ will be described.

An optical system can be seen as a path for transmitting information like an electrical circuit in that an optical system conveys the shape, location, color, and the like of a given object via light. For conciseness, the discussion below is directed to a one-dimensional optical system having x and x' axes on an object plane and an image plane, respectively, with a magnification rate of 1. Assuming that a point light source which has a brightness (amplitude or intensity) of 1 at the original point of the object plane produces an image h(x'), an object having a brightness f(x) will produce an image g(x') which can be expressed by eq. 1:

$$g(x') = \int f(x')h(x'-x)dx \qquad \text{eq. 1}$$

Once h(x') is known, the image g(x') of an object can be calculated from eq. 1, irrespective of its brightness distribution f(x). Therefore, the characteristics of an optical system can be reasonably approximated based only on h(x').

Applying a Fourier transform to h(x') gives eq. 2, where i represents an imaginary unit:

$$H(\omega) = \int h(x')\exp(\omega x')dx' \qquad \text{eq. 2}$$

By analogy with an electric circuit, an optical transfer function (hereinafter referred to as "OTF") may be seen as a frequency filter having frequency characteristics as expressed by eq. 3 with respect to a spatial frequency $\omega$:

$$H(\omega) = T(\omega)\exp\{i\theta(\omega)\} \qquad \text{eq. 3}$$

In the above equation, $T(\omega)$ is what is commonly referred to as an MTF (modulation transfer function), and $\theta(\omega)$ is what is commonly referred to as a PTF (phase transfer function).

If the optical system of an optical head which is capable of resolving the structure of a given object into spatial frequency spectra could transmit all of the spectra to the image plane without attenuation or deformation, then the OTF would be $H(\omega)=1$. However, in practice, diffraction plays a certain role. Accordingly, the intensity of a diffraction image of a non-aberration system in a one-dimensional model which is under the influence of diffraction is known to be expressed by eq. 4:

$$h(x')=(\sin akx'/(akx'))^2 \quad \text{eq. 4}$$

The above equation assumes that the point light source has an intensity of $h(x')$.

Since $k=2\pi/\lambda b$ (where b is the distance from the principal face of the lens on the image side to the image plane; and the "lens" refers to the objective lens 3), the OTF of a non-aberration system, based on eq. 2, can be expressed by eq. 5:

$$H(\omega) = \pi(1 - \omega/2ak)/ak \quad \omega \leq 2ak \quad \text{eq. 5}$$
$$= 0 \quad \omega > 2ak$$

In the above equation, 2a is the effective diameter or aperture diameter of the objective lens 3. The cut-off frequency $f_{sco}$ in the case where $H(\omega)$ equals zero can be expressed by eq. 6:

$$f_{sco}=2NA/\lambda \quad \text{eq. 6}$$

In the above equation, NA represents the numerical aperture of the objective lens 3 and $\lambda$ represents the wavelength of the light beam.

Assuming that the pits no longer satisfy the critical conditions for obtaining an image (i.e., OFT critical conditions) at a pitch $d_{co}$ (hereinafter referred to as the "sub-OTF critical pitch"), eq. 6 can be expressed as eq. 7:

$$d_{co} \leq 1/f_{sco} \quad \text{eq. 7}$$
$$\leq \lambda/(2NA)$$

The optical disk according to the present example has arrays of pits formed with a pitch which is equal to or smaller than twice the sub-OTF critical pitch $d_{co}$ as expressed by eq. 7. The pitch d of the optical disk according to the present example can be expressed by eq. 8:

$$d \leq \lambda/NA \quad \text{eq. 8}$$

For the sake of reading out information recorded on an optical disk, it is not preferable to form the pit arrays with a pitch which is in the vicinity of the OTF critical pitch. However, the inventors have found that the use of a relatively small pit pitch, within the range of about zero to about $\lambda/NA$, reduces the intensity variation of the diffraction image in the presence of a radial tilt.

Figure 2:
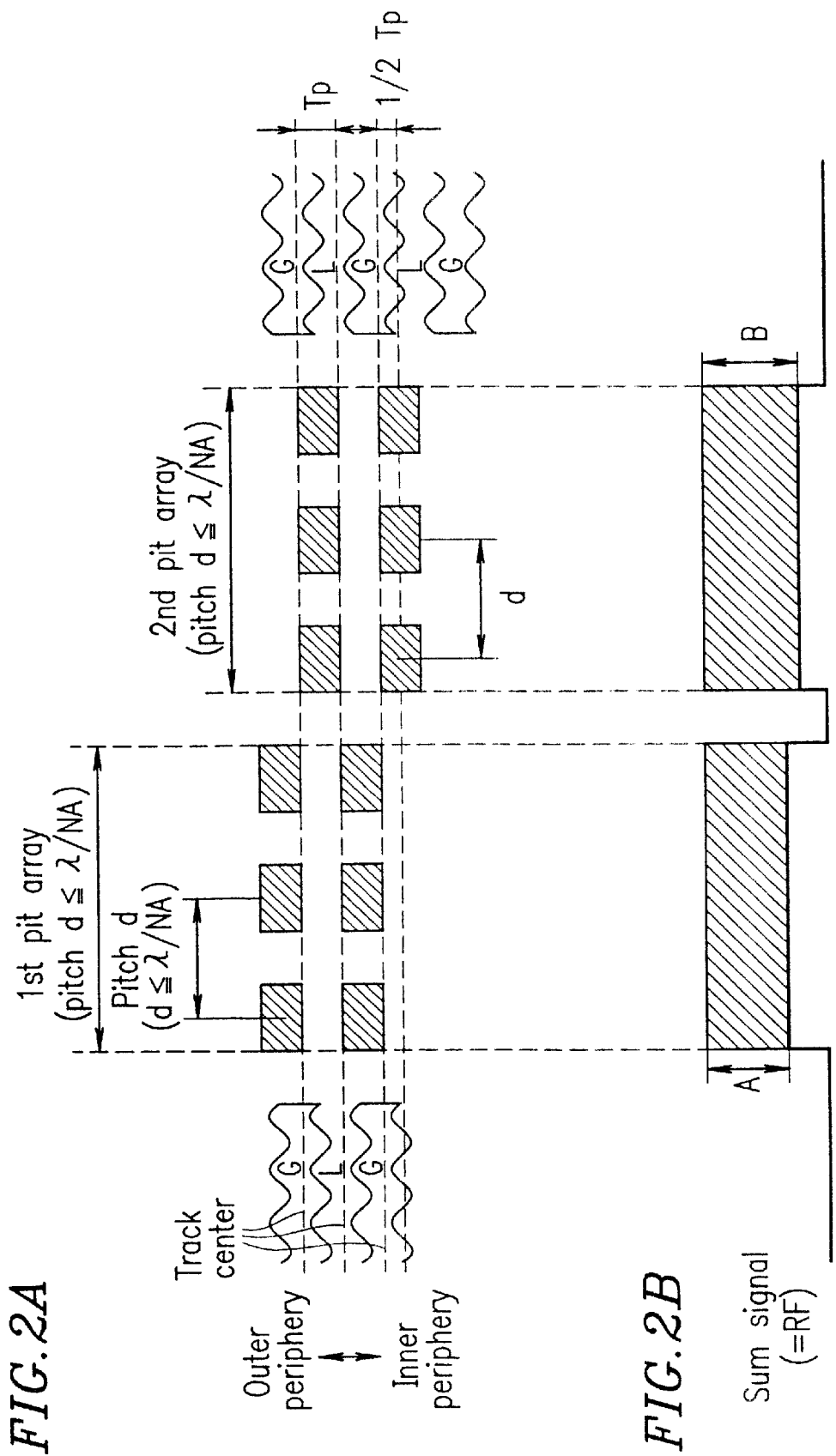
FIG. 2A is a block diagram schematically illustrating an optical disk according to the present invention.
FIG. 2B is a waveform diagram illustrating a reproduction signal RF which is based on reproduction signals from pits which are formed with a predetermined pitch which is equal to or smaller than $\lambda/NA$.

According to the present invention, it is possible to obtain an off-tracking detection signal having a relatively small off-tracking error despite a possible radial tilt (described later), by disposing the pits so as to be reciprocally or complimentarily shifted by 1/2 track pitch with respect to a track center with a pitch that satisfies the condition expressed by eq. 8, and detecting the off-tracking (i.e., shift of the light beam from the track center) based on the difference in amplitude between the reproduction signals therefrom (as shown in FIG. 2).

By substituting $\lambda$=about 660 nm and NA=about 0.6 in eq. 8, the pits are formed with a predetermined pitch d which is equal to or smaller than $\lambda/NA$, where $d \leq$ about 1.1 $\mu$m.

Next, the relationship between the modulation method for information recorded on an optical disk and the pits which are formed with a predetermined pitch equal to or smaller than $\lambda/NA$ according to the present invention will be described.

In general, when an optical disk apparatus records information on an optical disk, the information is recorded in a modulated form, and when the information is reproduced from the optical disk, a reproduction signal is demodulated in accordance with the modulation rule which was used for recording the information. When an 8–16 modulation method is adopted as a modulation method, for example, the minimum time which can be used after modulation is 3T, where T represents the reproduction reference time which is determined in accordance with the reproduction clock. Assuming that the length PLt of a reference pit whose reproduction time equals the reproduction reference T is about 0.14 $\mu$m, and that the space PSt between the reference pits is about 0.14 $\mu$m, the pits according to the present invention, which are formed with a predetermined pitch d which is equal to or smaller than $\lambda/NA$, preferably have a length each equivalent to three times the reference pit length PLt and are spaced from one another by a distance equivalent to four times the reference pit space PSt. Accordingly, the pits are formed with a pitch d which is equivalent to seven times the reproduction reference time T.

An 8–16 modulation method is described in Journal of Visual Information Media Society, vol. 51, no. 7, pp. 947–951, and 957–960 (1997), and "NEXT-GENERATION OPTICAL DISK TECHNOLOGY" published by K. K. Torikkepusu (Jul. 24, 1995). Therefore, any detailed description of this method is omitted herein.

The time span of 7T which is used according to the present example is equivalent to about 0.98 $\mu$m (typical) on the innermost periphery of each one of the zones which are split along the radius direction of the optical disk, and about 1.015 $\mu$m (typical) on the outermost periphery of each zone. Allowing for a pit formation error of about ±0.02 $\mu$m, the pitch d shown in FIG. 2A is preferably within in a range of about 0.96 to about 1.035 $\mu$m.

Thus, by ensuring that the reproduction time of a pit and an inter-pit space it a multiple of the reproduction reference time and is equal to or greater than the minimum time 3T (which is determined by the modulation method), it becomes possible to ensure that the pit arrays are cut so as to have a pitch equal to or smaller than $\lambda/NA$, by simply using any modulation circuitry that conforms to a modulation method which is adopted in the address regions and the like (described later) of an optical disk. Thus, the optical disk production is facilitated.

Next, the pitch as measured from the center of a land track to the center an adjoining land track on an optical disk (hereinafter referred to as a "groove pitch $\Lambda r$") and the predetermined pitch d of the pits according to the present invention which is equal to or smaller than $\lambda/NA$ will be described with reference to FIGS. 3, 4, 5, and 6.

Figure 3:
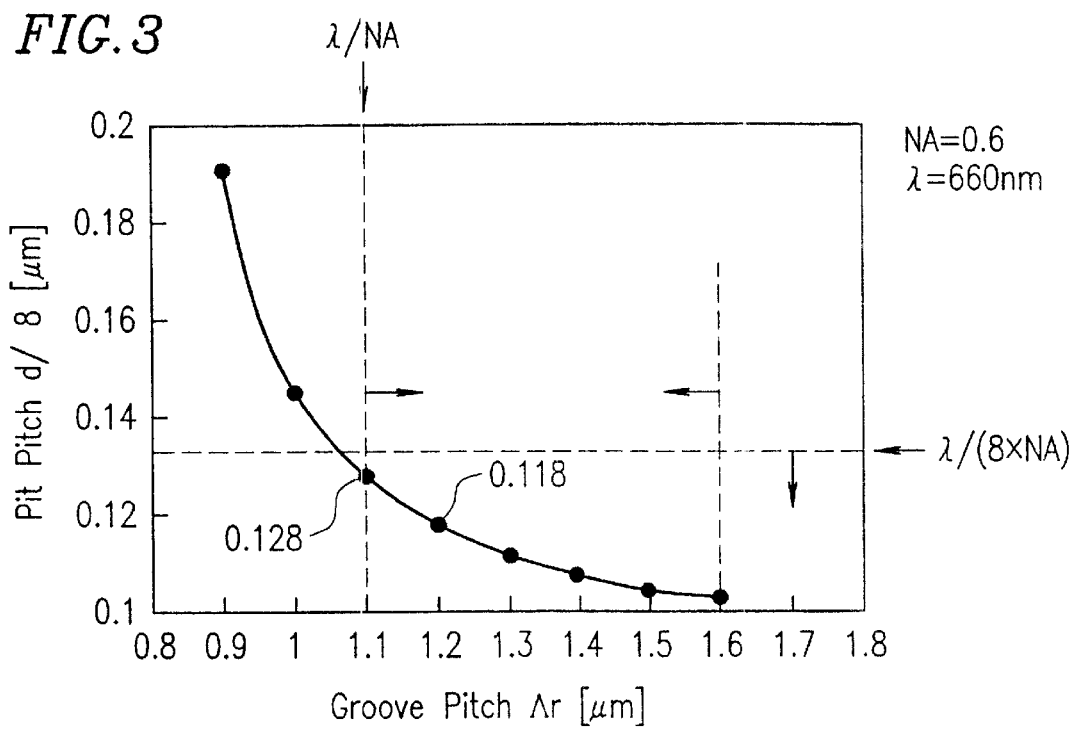
FIG. 3 is a graph illustrating the relationship between a groove pitch $\Lambda r$ and a pit pitch d under the conditions that $\lambda$=about 660 nm and NA=about 0.6 for minimizing the influence of off-tracking due to a radial tilt.

FIG. 3 is a graph illustrating the relationship between the groove pitch $\Lambda r$ and the pit pitch d. FIG. 3 is obtained by deriving a pit pitch d which substantially minimizes the influence of off-tracking due to a radial tilt under the following conditions, and plotting 1/8 of the pitch d on the vertical axis with the groove pitch $\Lambda r$ being taken on the horizontal axis: the light beam has a wave-length $\lambda$ of about 660 nm; the objective lens has a numerical aperture NA of about 0.6; the groove width (hereinafter referred to as "GW") is about 0.4 $\mu$m: and a taper width of about 0.05 $\mu$m is used for the groove formation.

As seen from FIG. 3, the value of the pitch d which substantially minimizes the influence of off-tracking due to a radial tilt under the condition that the groove pitch Λr=about 1.2 μm is 8×0.118 μm=about 0.944 μm. On the other hand, the value of the pitch d which substantially minimizes the influence of off-tracking due to a radial tilt under the condition that λ/NA=about 1.1 μm is about 0.944 μm. Thus, by forming the pit arrays with a pitch of about 0.944 μm, it is possible to obtain, based on the reproduction signals from such pit arrays, off-tracking information with a relatively small off-tracking error due to a radial tilt (described later). A curve which represents the relationship between the groove pitch Λr and the pitch d as shown in FIG. 3 can be represented by a multi-term approximation expressed by eq. 9:

$$d=8\times\{10.069\times(\Lambda r''6)-79.159\times(\Lambda r''5)+258.48\times(\Lambda r''4)-448.99\times(\Lambda r''3)+437.89\times(\Lambda r''2)-227.64\times\Lambda r+49.491\} \quad \text{eq. 9}$$

It is known that an approximation curve provides better approximation as the degree of the approximation curve is increased. However, the inventors confirmed that by using a sixth-degree approximation curve as represented by eq. 9, the putative value of the pitch d which substantially minimizes the off-tracking error due to a radial tilt substantially matches with respect to a given groove pitch Λr. Accordingly, sixth-degree multi-term equation as represented by eq. 9 was used to derive the approximation curve described herein.

By substituting the value of the groove pitch Λr into the approximated equation (eq. 9) thus obtained, the value of the pitch d can be calculated which minimizes the influence of off-tracking due to a radial tilt under the conditions that the light beam has a wavelength λ of about 660 nm; the objective lens has a numerical aperture NA of about 0.6, the groove width GW is about 0.4 μm; and a taper width of about 0.05 μm is used for the groove formation. By substituting groove pitch Λr=about 1.2 μm in eq. 9 according to the present example, the value of the pitch d which substantially minimizes the influence of off-tracking due to a radial tilt is calculated to be about 0.994 μm. As seen from FIG. 3, the groove pitch Λr is not limited to about 1.2 μm. So long as the groove pitch Λr is limited to a value which is equal to or greater than about 1.1 μm, i.e., equal to or greater than λ/NA, the value of the pitch d which substantially minimizes the influence of off-tracking due to a radial tilt will become equal to or smaller than about 1.024 μm (which is even smaller than the value of λ/NA under the conditions that the light beam has a wavelength λ of about 660 nm; and the objective lens has a numerical aperture NA of about 0.6), and be greater than 0.

In practice, the groove pitch Λr is preferably prescribed at a value which is smaller than about 1.6 μm in order to attain high-density information recording on the optical disk.

So long as the groove pitch Λr is equal to or greater than λ/NA, the value of the pitch d which substantially minimizes the influence of off-tracking due to a radial tilt as shown in FIG. 3 is not affected by the groove width GW or the taper width for the groove formation. That is, the groove width GW and the taper width for the groove formation do not affect the relationship between the groove pitch Λr and the value of the pitch d which substantially minimizes the influence of off-tracking due to a radial tilt.

Figure 4:
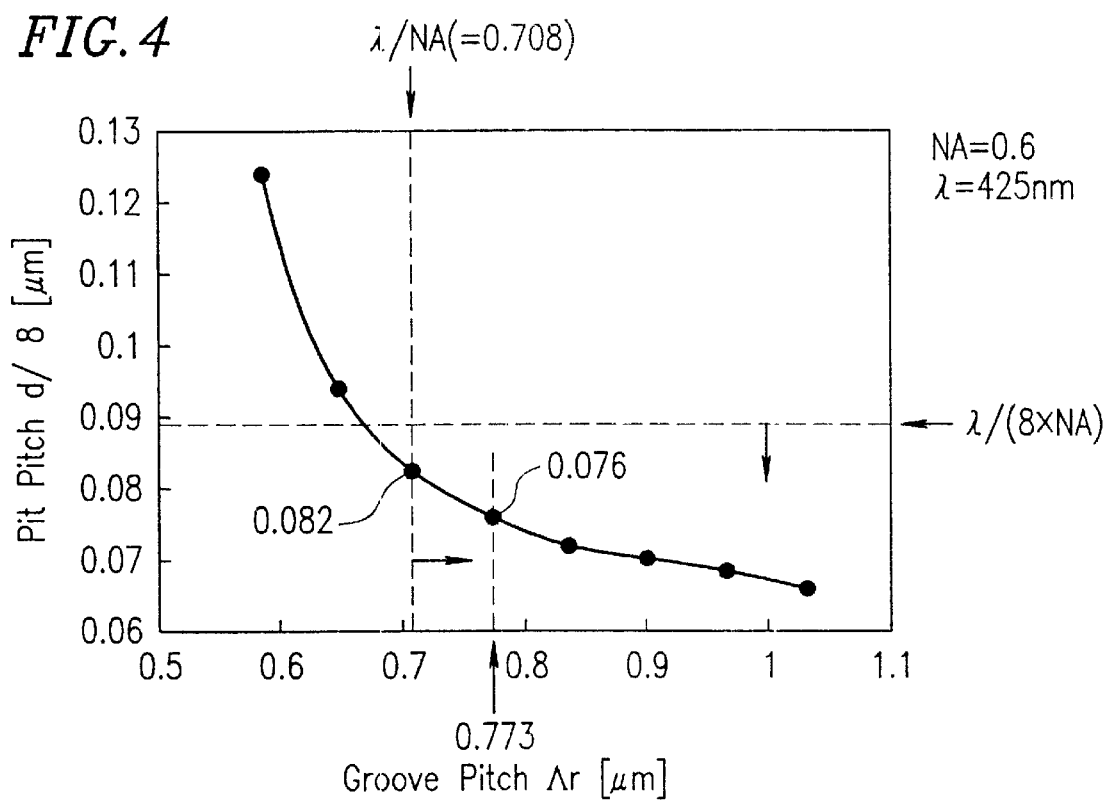
FIG. 4 is a graph illustrating the relationship between a groove pitch $\Lambda r$ and a pit pitch d under the conditions that $\lambda$=about 425 nm and NA=about 0.6 for minimizing the influence of off-tracking due to a radial tilt.

FIG. 4 is a graph illustrating the relationship between the optimum groove pitch Λr and the pit pitch d under the same conditions as those used in FIG. 3 except that the wavelength λ is about 425 nm. FIG. 4 is obtained by plotting 1/8 of the value of the pitch d which substantially minimizes the influence of off-tracking due to a radial tilt on the vertical axis, with the groove pitch Λr being taken on the horizontal axis. Thus, the conditions used in the graph of FIG. 4 are: the light beam has a wavelength λ of about 425 nm; the objective lens has a numerical aperture NA of about 0.6; the groove width GW is about 0.4 μm; and a taper width of about 0.05 μm is used for the groove formation.

Let us assume that the wavelength λ of the light beam in the graph of FIG. 3 is $\lambda_1$ and the NA of the objective lens in the graph of FIG. 3 is $NA_1$; and that the wavelength λ of the light beam in the graph of FIG. 4 is $\lambda_2$ and the NA of the objective lens in the graph of FIG. 4 is $NA_2$. As is well town in the art, increasing the surface recording density of an optical disk requires reducing the size of the spot converged on the optical disk, which in turn requires the use of a light source which provides shorter wavelength light and an objective lens having a large numerical aperture NA. Moreover, it would be reasonable to reduce the groove pitch in accordance with the reduced spot size of the light beam. Accordingly, it would be reasonable to assume that the groove pitch Λr changes in proportion with the value of λ/NA as the wavelength λ of the light beam changes from $\lambda_1$ to $\lambda_2$ and the NA of the objective lens changes from $NA_1$ to $NA_2$. Now, based on this assumption, the graph of FIG. 4 will be discussed by paying attention to the groove pitch Λr of about 1.2 μm and the pitch d of about 0.944 μm which substantially minimizes the influence of off-tracking due to a radial tilt in the graph of FIG. 3.

First, the groove pitch Λr in the graph of FIG. 4 is about 0.773 μm, as calculated by multiplying 1.2 μm (FIG. 3) by 0.644 ($\approx(\lambda_2\times NA_1)/(\lambda_1\times NA_2)$).

Next, in the graph of FIG. 4, the value of the pitch d which substantially minimizes the influence of off-tracking due to a radial tilt under the condition that groove pitch Λr=about 0.773 μm is calculated to be about 0.608 μm, which is eight times as large as 0.076 μm. Since 0.608 μm/0.944 μm=0.644≈$(\lambda_2\times NA_1)/(\lambda_1\times NA_2)$, it will be seen that the change from the value of the pitch d which substantially minimizes the influence of off-tracking due to a radial tilt under the condition Λr=about 1.2 μm (FIG. 3), to that under the condition Λr=about0.773 μm (FIG. 4), is substantially in proportion with the change in the λ/NA value.

As shown in FIG. 4, if the groove pitch Λr is equal to or greater than λ/NA (=about 0.708 μm), the value of the pitch d which substantially minimizes the influence of off-tracking due to a radial tilt is equal to or smaller than λ/NA. Thus, by forming a first array of pits at a position which is shifted by a predetermined amount along one of the directions perpendicular to the track so as to have a pitch which is in the vicinity of d≦λ/NA, and forming a second array of pits at a position which is shifted by a predetermined amount along the other direction perpendicular to the track so as to have a pitch which is in the vicinity of d≦λ/NA, it becomes possible to detect the shift of the light beam with respect to a track center with reduced influence of off-tracking due to a radial tilt, based on the difference in the reproduction signals from the first and second pit arrays.

Figure 5:
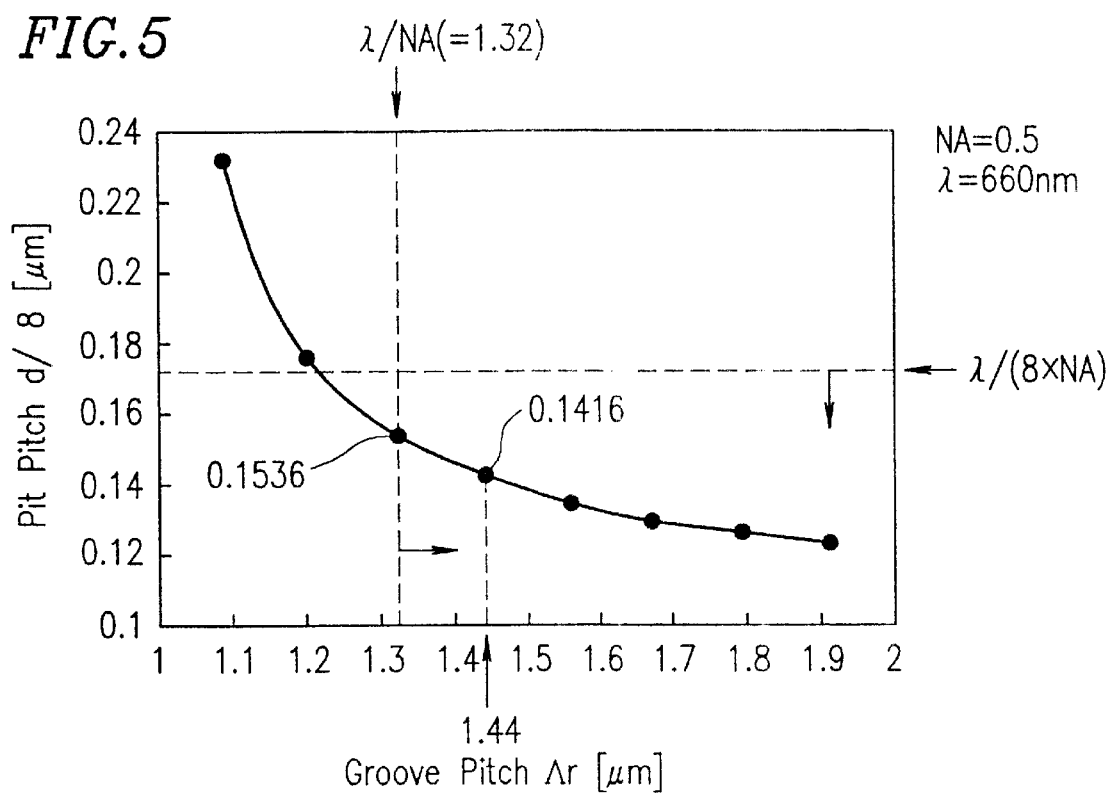
FIG. 5 is a graph illustrating the relationship between a groove pitch $\Lambda r$ and a pit pitch d under the conditions that $\lambda$=about 660 nm and NA=about 0.5 for minimizing the influence of off-tracking due to a radial tilt.

FIG. 5 is a graph illustrating the relationship between the optimum groove pitch Λr and the pit pitch d under the same conditions as those used in FIG. 3 except that the numerical aperture NA of the objective lens is about 0.5. FIG. 5 is obtained by plotting 1/8 of the value of the pitch d which substantially minimizes the influence of off-tracking due to a radial tilt on the vertical axis, with the groove pitch Λr being taken on the horizontal axis. Thus, the conditions used in the graph of FIG. 5 are: the light beam has a wavelength λ of about 660 nm; the objective lens has a numerical aperture NA of about 0.5; the groove width GW is about 0.4 $\mu$m; and a taper width of about 0.05 $\mu$m is used for the groove formation.

Let us assume that the wavelength $\lambda$ of the light beam in the graph of FIG. 3 is $\lambda_1$ and the NA of the objective lens in the graph of FIG. 3 is $NA_1$; and that the wavelength $\lambda$ of the light beam in the graph of FIG. 5 is a $\lambda_3$ and the NA of the objective lens in the graph of FIG. 5 is $NA_3$. For the same reason as described with reference to FIG. 4, it is assumed that the groove pitch $\Lambda r$ changes in proportion with the value of $\lambda$/NA as the wavelength $\lambda$ of the light beam changes from $\lambda_1$ to $\lambda_3$ and the NA of the objective lens changes from $NA_1$ to $NA_3$. Now, based on this assumption, the graph of FIG. 5 will be discussed by paying attention to the groove pitch $\Lambda r$ of about 1.2 $\mu$m and the pitch d of about 0.944 $\mu$m which substantially minimizes the influence of off-tracking due to a radial tilt in the graph of FIG. 3.

First, the groove pitch $\Lambda r$ in the graph of FIG. 5 is about 1.44 $\mu$m, as calculated by multiplying 1.2 $\mu$m (FIG. 3) by 1.2 ($\approx (\lambda_3 \times NA_1)/(\lambda_1 \times NA_3)$).

Next, in the graph of FIG. 5, the value of the pitch d which substantially minimizes the influence of off-tracking due to a radial tilt under the condition $\Lambda r$=about 1.44 $\mu$m is calculated to be about 1.1328 $\mu$m, which is eight times as large as 0.1416 $\mu$m. Since 1.1328 $\mu$m/0.944 $\mu$m=1.2$\approx (\lambda_3 \times NA_1)/(\lambda_1 \times NA_3)$, it will be seen that the change from the value of the pitch d which substantially minimizes the influence of off-tracking due to a radial tilt under the condition $\Lambda r$=about 1.2 $\mu$m (FIG. 3), to that under the condition $\Lambda r$ about 1.44 $\mu$m (FIG. 5), is in proportion with the change in the $\lambda$/NA value.

As shown in FIG. 5, if the groove pitch $\Lambda r$ is equal to or greater than $\lambda$/NA (=about 1.32 $\mu$m), the value of the pitch d which substantially minimizes the influence of off-tracking due to a radial tilt is equal to or smaller than $\lambda$/NA. Thus, by forming a first array of pits at a position which is shifted by a predetermined amount along one of the directions perpendicular to the track so as to have a pitch which is in the vicinity of d$\leq \lambda$/NA, and forming a second array of pits at a position which is shifted by a predetermined amount along the other direction perpendicular to the track so as to have a pitch which is in the vicinity of d$\leq \lambda$/NA, it becomes possible to detect the shift of the light beam with respect to a track center with reduced influence of off-tracking due to a radial tilt, based on the difference in the reproduction signals from the first and second pit arrays.

From the above discussion with reference to FIGS. 3, 4, and 5, it will be seen that the groove pitch which substantially minimizes the influence of off-tracking due to a radial tilt (hereinafter referred to as the "optimized groove pitch $\Lambda r_{optm}$") and the pit pitch which substantially minimizes the influence of off-tracking due to a radial tilt (hereinafter referred to as the Optimized pitch $d_{optm}$") are in proportion with $\lambda$/NA, as seen from eq. 10 and eq. 11;

$$\Lambda r_{optm} \, \lambda/NA \qquad \text{eq. 10}$$

$$d_{optm} \, \lambda/NA \qquad \text{eq. 11}$$

Accordingly, a generalized relationship between the groove pitch $\Lambda r$ and the pit pitch d can be obtained by multiplying both the horizontal axis (i.e., the groove pitch $\Lambda r$) and the vertical axis (pit pitch d) of the graph of FIG. 3 by NA/$\lambda$.

Now, the relationship between the optimized groove pitch $\Lambda r_{optm}$ and the optimized pit pitch $d_{optm}$ as calculated from the approximated equation of eq. 9 will be generalized with respect to the light beam wavelength $\lambda$ and the objective lens numerical aperture NA.

Figure 6:
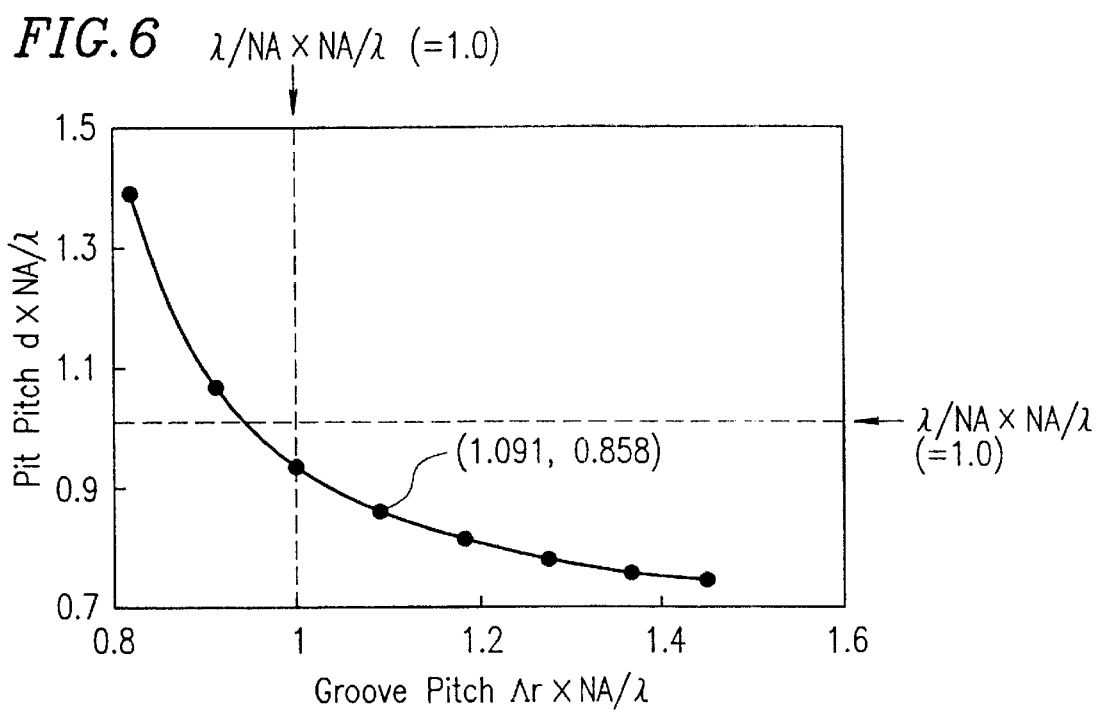
FIG. 6 is a graph in which the relationship between $\Lambda r$ and d for minimizing the influence of off-tracking due to a radial tilt is generalized by multiplying the groove pitch $\Lambda r$ and the pit pitch d in the graph of FIG. 3 by $NA/\lambda$.

FIG. 6 is a graph in which the relationship between $\Lambda r$ and d is generalized by multiplying the groove pitch $\Lambda r$ and the pit pitch d in the graph of FIG. 3 by NA/$\lambda$. The horizontal axis of FIG. 6 represents a value obtained by multiplying the groove pitch $\Lambda r$ by NA/$\lambda$; and the vertical axis of FIG. 6 represents a value obtained by multiplying the pit pitch d by NA/$\lambda$. The horizontal axis value (X), the optimized groove pitch $\Lambda r_{optm}$, the objective lens numerical aperture NA, and the light beam wavelength $\lambda$ satisfy eq. 12:

$$X = \Lambda r_{optm} \times NA/\lambda \qquad \text{eq. 12}$$

The vertical axis value (Y), the optimized pit pitch $d_{optm}$, the objective lens numerical aperture NA, and the light beam wavelength $\lambda$ satisfy eq. 13:

$$Y = d_{optm} \times NA/\lambda \qquad \text{eq. 13}$$

A curve which represents the relationship between $X(=\Lambda r_{optm} \times NA/\lambda)$ and $Y(=d_{optm} \times NA/\lambda)$ shown in the graph of FIG. 6 can be expressed by a multi-term approximation of eq. 14:

$$Y = 119.8437 \times (X''6) - 859.8443 \times (X''5) + 2562.7631 \times (X''4) = 4063.5930 \times (X''3) + 3618.1612 \times (X''2) - 1717.4253 \times X + 341.0248 \qquad \text{eq. 14}$$

Thus, a generalized formula representing the relationship between the optimized groove pitch $\Lambda r_{optm}$ and the optimized pit pitch $d_{optm}$ has been obtained.

Now, the value of the pitch d which substantially minimizes the influence of off-tracking due to a radial tilt under the condition $\Lambda r$ about 1.2 $\mu$m (FIG. 3) is about 0.994 $\mu$m. The groove pitch $\Lambda r$ (=about 1.2 $\mu$m) in the graph of FIG. 3 is multiplied by NA/$\lambda$ to give 1.091, as shown on the horizontal axis of the graph of FIG. 6. Under this condition, we will discuss a value which is obtained by multiplying the pitch d which substantially minimizes the influence of off-tracking due to a radial tilt by NA/$\lambda$.

Given that the groove pitch $\Lambda r$ in the graph of FIG. 3 is multiplied by NA/$\lambda$ to give about 1.091 as shown on the horizontal axis of the graph in FIG. 6, the pitch d which substantially minimizes the influence of off-tracking due to a radial tilt, being multiplied by NA/$\lambda$, should equal the pitch d (=about 0.994 $\mu$m) which substantially minimizes the influence of off-tracking due to a radial tilt in the graph of FIG. 3 (where the groove pitch $\Lambda r$ is about 1.2 $\mu$m) being multiplied by NA/$\lambda$.

On the other hand, as seen from FIG. 6, the value of the pitch d which substantially minimizes the influence of off-tracking due to a radial tilt (being multiplied by NA/$\lambda$) is equal to or smaller than about 1.0 so long as the pitch d which substantially minimizes the influence of off-tracking due to a radial tilt being multiplied by NA/$\lambda$ is equal to or greater than about 1.0. Thus, the pit pitch d is equal to or smaller than $\lambda$/NA in this area.

Accordingly, even in the case where the light beam wavelength $\lambda$ and the object lens numerical aperture NA are different from those in the graphs of FIGS. 3, 4, and 5, the aforementioned generalized formula (eq. 14) can be used to calculate the optimum groove pitch $\Lambda r_{optm}$ and the optimum pit pitch $d_{optm}$ for a given light beam wavelength $\lambda$ and a given object lens numerical aperture NA.

Hereinafter, the calculation for the optimum groove pitch $\Lambda r_{optm}$ and the optimum pit pitch $d_{optm}$ using the generalized formula of eq. 14 will be described with respect to a case where the light beam wavelength $\lambda$ changes from $\lambda_1$ to $\lambda_2$ or the objective lens numerical aperture NA changes from $NA_1$ to $NA_2$.

First, by substituting the light beam wavelength $\lambda_1$ and the objective lens numerical aperture $NA_1$ in eq. 12, the generalized value X of the optimum groove pitch $\Lambda r_{optm}$ can be expressed as eq. 15.

$$X = \Lambda r_{optm} \times NA_1 / \lambda_1 \qquad \text{eq. 15}$$

By multiplying eq. 15 by $\lambda_2/NA_2$, the optimum groove pitch $\Lambda r_{optm2}$ after the light beam wavelength has been changed to $\lambda_2$ and the objective lens numerical aperture has been changed to $NA_2$ can be expressed by eq. 16:

$$\begin{aligned} \Lambda r_{optm2} &= X \times (\lambda_2/NA_2) \qquad \text{eq. 16} \\ &= \Lambda r_{optm} \times NA_1/\lambda_1 \times (\lambda_2/NA_2) \\ &= \Lambda r_{optm} \times (\lambda_2/\lambda_1) \times (NA_1/NA_2) \end{aligned}$$

By substituting the light beam wavelength $\lambda_1$ and the objective lens numerical aperture $NA_1$ in eq. 13, the generalized value Y of the optimum pit pitch $d_{optm}$ can be expressed as eq. 17.

$$Y = d_{optm} \times NA_1 / \lambda_1 \qquad \text{eq. 17}$$

By multiplying eq. 17 by $\lambda_2/NA_2$, the optimum pit pitch $d_{optm2}$ after the light beam wavelength has been changed to $\lambda_2$ and the objective lens numerical aperture has been changed to $NA_2$ can be expressed as eq. 18:

$$\begin{aligned} d_{optm2} &= Y \times (\lambda_2/NA_2) \qquad \text{eq. 18} \\ &= d_{optm} \times NA_1/\lambda_1 \times (\lambda_2/NA_2) \\ &= d_{optm} \times (\lambda_2/\lambda_1) \times (NA_1/NA_2) \end{aligned}$$

Thus, in the case where the value of the light beam wavelength $\lambda$ and/or the value of the objective lens numerical aperture NA changes, the optimum groove pitch $\Lambda r_{optm2}$ after the changes in the respective values can be calculated by substituting in eq. 16 the following values: the wavelength $\lambda_1$ before the change, the numerical aperture $NA_1$ before the change, the wavelength $\lambda_2$ after the change, and the numerical aperture $NA_2$ after the change. Similarly, the optimum pit pitch $d_{optm2}$ under the optimum groove pitch $\Lambda r_{optm2}$ after the changes in the respective values can be calculated by substituting in eq. 18 the following values: the wavelength $\lambda_1$ before the change, the numerical aperture $NA_1$ before the change, the wavelength $\lambda_2$ after the change, and the numerical aperture $NA_2$ after the change.

As described above, the pit pitch $d_{optm}$ which is free from the influence of a radial tilt can be determined in accordance with the light beam wavelength $\lambda$, the objective lens numerical aperture NA, the groove pitch $\Lambda r$, and the like. As is well known in the art, increasing the surface recording density of an optical disk requires reducing the size of the spot converged on the optical disk, which in turn requires the use of a light source which provides shorter wavelength light. Examples of short wavelength lasers include SEG (second harmonic generation) blue lasers which utilize an SHG technique based on a near infrared semiconductor laser and a quasi phase match (hereinafter referred to as "QPM") device, blue-purple nitride type semiconductor lasers, and the like. Even in the case of employing such short-wavelength light sources for high-density recording, the optimum groove pitch $\Lambda r_{optm}$ and the optimum pit pitch $d_{optm}$ can be calculated by using the generalized formula (eq. 12) representing the relationship between the optimum groove pitch $\Lambda r_{optm}$ and the optimum pit pitch $d_{optm}$, the formula for calculating the optimum groove pitch $\zeta r_{optm2}$ (eq. 14), and the formula for calculating the optimum pit pitch $d_{optm2}$ (eq. 16).

For example, by substituting $\lambda$=425 nm and NA=0.6 in eq. 14 and eq. 16, the optimum groove pitch $\Lambda r_{optm2}$ can be calculated as 0.773 $\mu$m, and the optimum pit pitch $d_{optm2}$ can be calculated as 0.608 $\mu$m, as already described with reference to FIG. 4. As described with reference to FIG. 3, the groove width GW and the taper width used for the groove formation do not directly affect the relationship between the groove pitch $\Lambda r$ and the pitch d which substantially minimizes the influence of an off-tracking error due to a radial tilt. Therefore, the groove width GW may be prescribed as about 0.26 $\mu$m since this value is substantially in proportion with $\lambda$/NA, and the taper width used for the groove formation may be conveniently prescribed as about 0.05 $\mu$m as in the graph of FIG. 3.

The optimum pit pitch optm2 under the conditions that $\lambda$=425 nm and NA=0.6 as calculated above satisfies d≦about 0.708 $\mu$m, which is derived by substituting $\lambda$=425 nm and NA=0.6 in eq. 8 defining d≦$\lambda$/NA.

As described above, the pitch d which substantially minimizes the influence of off-tracking due to a radial tilt where the groove pitch $\Lambda r$ is equal to or greater than $\lambda$/NA is equal to or smaller than $\lambda$/NA (and larger than zero) Hence, the optical disk of the present invention is defined as an optical disk having pits formed with a predetermined pitch which is equal to or smaller than $\lambda$/NA.

Although the pitch d which substantially minimizes the off-tracking error due to a radial tilt under the condition $\Lambda r \geq \lambda$/NA is equal to or smaller than $\lambda$/NA, it is nonetheless preferable to minimize the groove pitch, $\Lambda r$, in order to improve the surface recording density of the optical disk. Since prescribing the groove pitch $\Lambda r$ at a value which is outrageously larger than $\lambda$/NA would result in a low tracking direction density, it is preferable that $\lambda$/NA≦groove pitch $\Lambda r$≦about 1.2×$\lambda$/NA.

Assuming that the length PLt of a reference pit whose reproduction time equals the reproduction reference T is about 0.09 $\mu$m, and that the space PSt between the reference pits is about 0.09 $\mu$m under the conditions $\lambda$=425 nm and NA=0.6, and that the pits are formed with a pitch a which is equivalent to seven times the reproduction reference time T, then the predetermined pitch d of the pits which is equal to or smaller than $\lambda$/NA is preferably within the range of about 0.61 $\mu$m to about 0.67 $\mu$m (when one allows for the pit formation error of about ±0.02 $\mu$m and the variation in the pit pitch d within each zone).

A reproduction signal (RF) can be obtained by detecting the light beam which is converged on and reflected from an optical disk having pits formed with a predetermined pitch equal to or smaller than $\lambda$/NA by means of the reproduction signal detector 4, and using a sum of the detected signals. Specifically, a reproduction signal (RF) obtained when a light beam passes over a pit array formed with a predetermined pitch which is equal to or smaller than $\lambda$/NA will have an amplitude A for a first pit array, and an amplitude B for a second pit array, as shown in FIG. 2B. The off-tracking detection signal according to the present example is derived from a difference between amplitude A and amplitude B of the respective reproduction signals obtained when a light beam passes over the first and second pit arrays.

Next, an optical disc will be described with reference to FIGS. 7A and 7B which includes address regions and has pits formed with a predetermined pitch which is equal to or smaller than $\lambda$/NA.

FIG. 7A is a block diagram schematically illustrating an optical disk which includes address regions and has pits formed with a predetermined pitch which is equal to or smaller than $\lambda/NA$. FIG. 7B is a waveform diagram illustrating a reproduction signal RF which is obtained based on a sum of the signals detected from the pits which are formed with a predetermined pitch which is equal to or smaller than $\lambda/NA$.

As shown in FIG. 7A, an address region includes, in this order, a first address: a second address; a third address; a fourth address; a first array of pits which are formed with a predetermined pitch which is equal to or smaller than $\lambda/NA$; and a second array of pits which are formed with a predetermined pitch which is equal to or smaller than $\lambda/NA$. The first and second address regions and the first pit array are each located at a position which is shifted from the end of a groove track toward the outer periphery side by ½ of the track pitch. The third and fourth address regions and the second pit array are each located at a position which is shifted from the end of a groove track toward the inner periphery side by 1/2 of the track pitch.

A reproduction signal RF can be obtained by a sum of the signals obtained by detecting the light beam which is converged on and reflected from the above-described optical disk including address regions and having pits formed with a predetermined pitch equal to or smaller than $\lambda/NA$ by means of the reproduction signal detector 4. Specifically, as shown in FIG. 7B, once the light beam has passed over the first to fourth addresses, the reproduction signal RF will have amplitude A while the light beam passes over the first pit array, and amplitude B while the light beam passes over the second pit array. An off-tracking detection signal can be obtained from a difference between amplitude A and amplitude B of the respective reproduction signals obtained when the light beam passes over the first and second pit arrays.

Next, the high-band tracking error signal (RFTE), the L/G switching signal (LGS), and the address gate signal (IDGATE) will be described with reference to FIGS. 8A to 8D.

FIGS. 8A to 8D are waveform diagrams showing, respectively, the high-band tracking error signal (RFTE), the L/G switching signal (LGS), and the address gate signal (IDGATE), which are obtained when a light beam follows along tracks on an SS-L/GFMT disk having pits formed with a predetermined pitch which is equal to or smaller than $\lambda/NA$.

Figure 8:
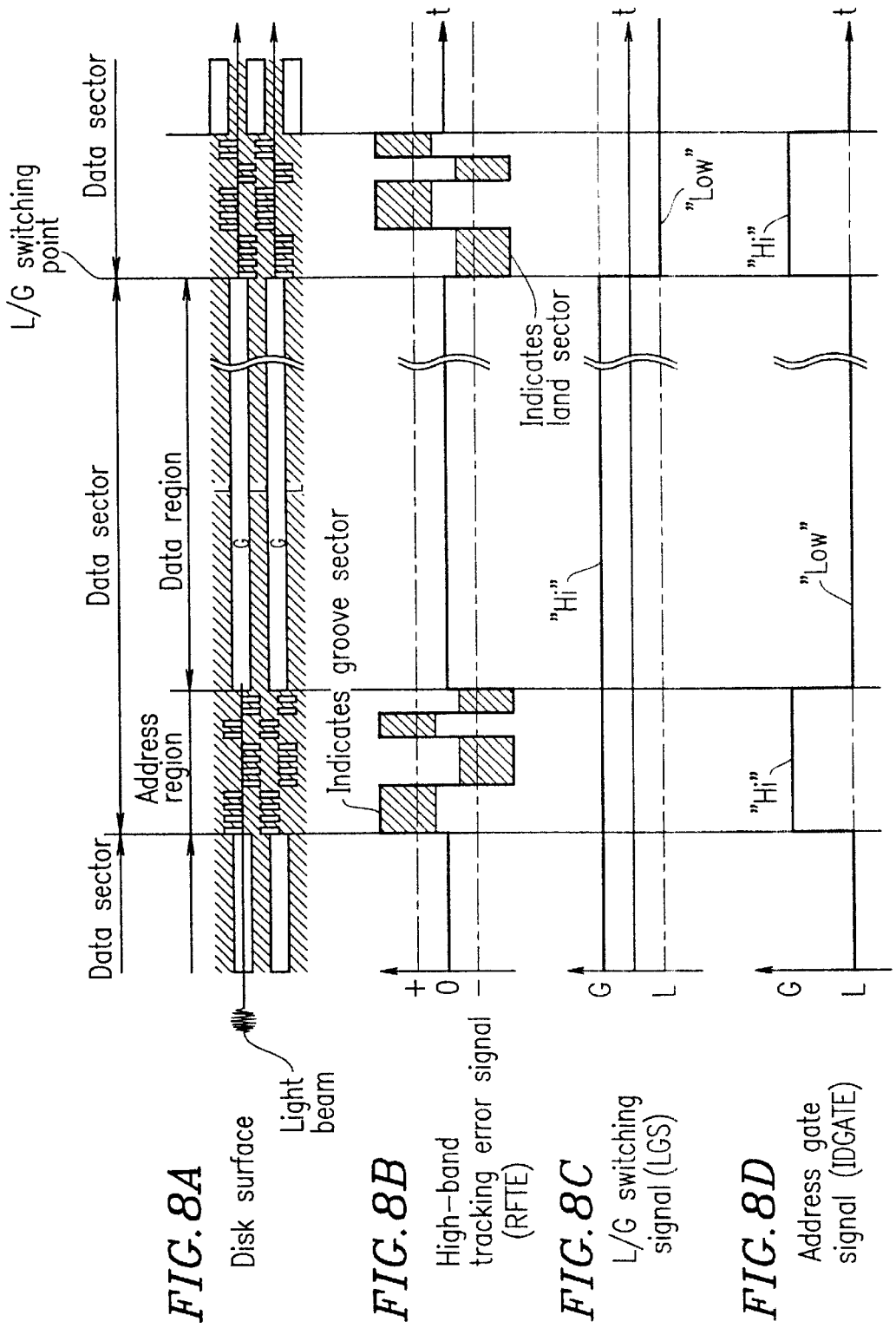
FIG. 8A schematically illustrates the track structure of an optical disk, upon which is illustrated a trajectory of a light beam that travels over from a groove track, a L/G switching point, and then to a land track.
FIG. 8B to FIG. 8D show the waveforms of an RFTE signal, an LGS signal, and an IDGATE signal, respectively, which are obtained as the light beam follows along respective tracks in accordance with the trajectory shown in FIG. 8A.

FIG. 8A schematically illustrates the track structure of an optical disk, upon which is illustrated the trajectory of a light beam that travels over from a groove track, a L/G switching point, and then to a land track. FIG. 8B to FIG. 8D show the waveforms of the respective signals obtained as the light beam follows along respective tracks in accordance with the trajectory shown in FIG. 8A.

As described above, each address region of this optical disk includes, at the beginning of each sector, pits which are disposed so as to be reciprocally or complimentarily shifted by ½ track pitch with respect to a track center along the radius direction of the optical disk (hereinafter such address region is referred to as a "CAPA" or "complimentarily allocated pit address"). In accordance with a CAPA having the structure shown in FIGS. 7A and 8A, address information which is recorded in the form of pits can be reproduced based on the high-band tracking error signal (RFTE) obtained when the light beam pass over the address region.

As the light beam passes over an address region while following along a groove track, the high-band tracking error signal (RFTE) will has a waveform (FIG. 8B) that responds to the address signal so as to be eminent first on the positive side of the zero level, and then on the negative side. As the light beam passes over a L/G switching point, the high-band tracking error signal (RFTE) will have a waveform (FIG. 8B) that responds to the address signal so as to be eminent first on the negative side of the zero level, and then on the positive side. As shown in FIG. 8C, the L/G switching signal (LGS) is at a "Hi (high)" level while the light beam is traveling over a groove track and at a "Low" level while the light beam is traveling over a land track.

Based on the RFTE signal, the land/groove detection section 11 detects the L/G switching signal LGS indicating whether the light beam which is radiated from the optical head 7 onto the optical disk is currently located on a groove track, or on a land track, that is formed in a spiral shape on the optical disk 1.

Specifically, the LGS signal is generated based on a signal obtained by digitizing a peak envelope of the RFTE signal (hereinafter referred to as a "PEPS" signal) and a signal obtained by digitizing a bottom envelope of the RFTE signal (hereinafter referred to as a "BEPS" signal). The LGS signal will indicate "groove track" if the logic level of the PEPS changes before the logic level of the BEPS changes as the light beam passes an address region while following along a given track. The LGS signal will indicate "land track" if the logic level of the BEPS changes before the logic level of the PEPS changes.

As shown in FIG. 8D, the address gate signal IDGATE for identifying an address region takes the "Hi" level when the light beam reaches an address region. The address gate signal IDGATE takes the "Low" level when the light beam, going past an address region, enters a data region.

In accordance with the RFTE signal from the reproduction signal detector 4, the address region identification section 10 outputs the IDGATE gate signal, which takes the "Low" level in a data region and the "Hi" level in an address region. Specifically, the IDGATE signal is generated from a logic OR signal of a PEPS signal (i.e., a digitized signal representing a peak envelope of the RFTE signal) and an inverted signal of a BEPS signal (i.e., a digitized signal representing a bottom envelope of the RFTE signal).

Hereinafter, the operation of an optical disk apparatus according to the present invention, which detects and compensates for an off-tracking based on reproduction signals from pits which are formed with a predetermined pitch which is equal to or smaller than $\lambda/NA$, will be described with reference to FIG. 1.

The optical disk apparatus rotates the optical disk 1 at a predetermined rotation rate, radiates a light beam from a semiconductor laser (not shown) on the optical disk 1, and performs focus servo control so as to ensure that the light beam radiated on the optical disk 1 maintains a predetermined convergence state.

The optical detector 5A converts the light beam reflected back from the optical disk 1 into voltage signals VTS1 and VTS2 to be used for generating a tracking error signal TES, and outputs the voltage signals VTS1 and VTS2 to the tracking error detection section 5B. The tracking error detection section 5B detects the tracking error signal TES based on the voltage signals VTS1 and VTS2 from the optical detector 5A. Moreover, the tracking error detection section 5B changes the zero level of the tracking error signal TES, i.e., the target position of the tracking servo control, based on a tracking error detection balance control signal TBALCNT or a tracking error detection offset control signal TOFTCNT output from the off-tracking compensation control section 13.

In accordance with the tracking error signal TES from the tracking error detection section 5B, the tracking control section 8 performs tracking servo by actuating the tracking actuator 6 via the driving section 9 so that the difference between a position indicated by the tracking error signal TES and the target position of the tracking servo control becomes zero.

The reproduction signal RF Is obtained from the reproduction signal detector 4 while performing the focus servo control and tracking servo control.

Figure 9:
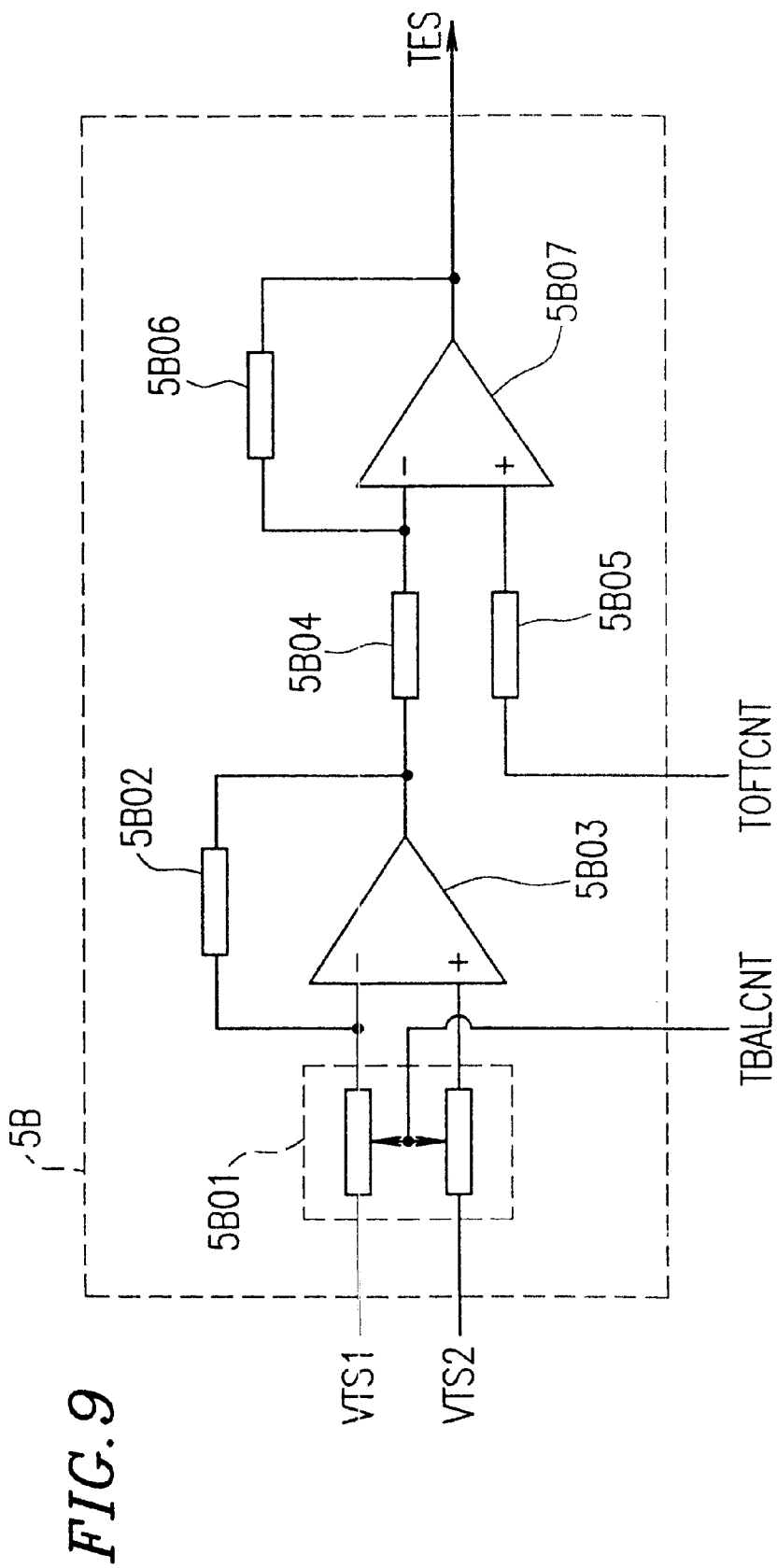
FIG. 9 is a block diagram illustrating the internal structure of a tracking error detection section 5B according to an example of the invention.

Next, the adjustment of the target position of the tracking servo control will be described with reference to FIG. 9. FIG. 9 is a block diagram illustrating the internal structure of the tracking error detection section 5B.

A tracking balance circuit 5B01 receives the VTS1, VTS2, and TBALCNT signals from the optical detector 5A. The tracking balance circuit 5B01 controls the ratio between the gain for the VTS1 signal and the gain for the VTS2 signal based on the TBALCNT signal, thereby adjusting the zero position of the output from a differential amplifier circuit 5B03 (described later) with respect to input signals. A resistor 5B02 determines the feedback gain in the differential amplifier circuit 5B03. The differential amplifier circuit 5B03 outputs a tracking error signal after the adjustment of the ratio of gains for the input signals has been made. A resistor 5B04, which receives the output signal from the differential amplifier circuit 5B03, determines the negative input gain in a differential amplifier circuit 5B07. A resistor 5B05, which receives the tracking error detection off set control signal TOFTCNT from the off-tracking compensation control section 13, determines the positive input gain in the differential amplifier circuit 5B07. A resistor 5B06 determines the feedback gain in the differential amplifier circuit 5B07.

A tracking error detection section 5B having the above-described configuration adjusts the zero position of the output signal from the differential amplifier circuit 5B03 with respect to the two input signals, by adjusting the ratio of gains for the input signals (i.e. the output signals from the optical detector 5A) in accordance with the TBALCNT signal from the off-tracking compensation control section 13, thereby generating the tracking error signal TES. By thus adjusting the tracking position, the light beam converged on the optical disk 1 is controlled so as to be located on a track center.

Alternatively, the tracking error detection section 5B may add or subtract an offset to/from the tracking error detection signal in accordance with the TOFTCNT signal from the off-tracking compensation control section 13, thereby adjusting the tracking position so as to control the light beam converged on the optical disk 1 to be located on a track center.

Figure 10:
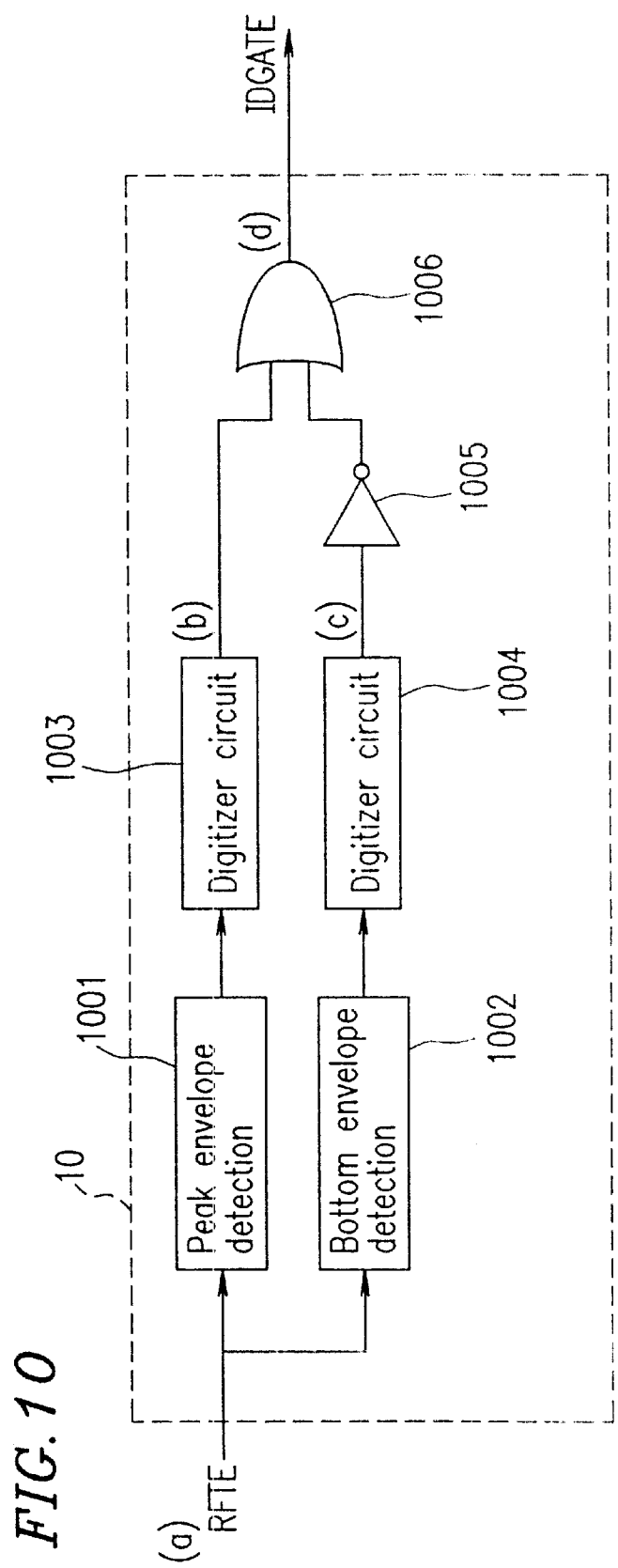
FIG. 10 is a block diagram illustrating the internal structure of an address region identification section 10 according to an example of the invention.

Next, the structure of the address region identification section 10 and its IDGATE output signal will be described with reference to FIGS. 10 and 11A to 11D. FIG. 10 is a block diagram illustrating the internal structure of the address region identification section 10. FIGS. 11A to 11D are waveform diagrams illustrating the waveforms of signals at points (a), (b), (c), (d), respectively, in the address region identification section 10 of FIG. 10. First, the component elements in FIG. 10 will be described.

A peak envelope detection section 1001 detects a peak envelope of the high-band tracking error signal RFTE from the reproduction signal detector 4. A bottom envelope detection section 1002 detects a bottom envelope of the high-band tracking error signal RFTE from the reproduction signal detector 4. A digitizer circuit 1003 digitizes the RFTE peak envelope from the peak envelope detection section 1001 using an appropriate threshold value. A digitizer circuit 1004 digitizes the RFTE bottom envelope from the bottom envelope detection section 1002 using an appropriate threshold value. A NOT circuit 1005 Inverts the output signal from the digitizer circuit 1004 and outputs the digitized signal. An OR circuit 1006 outputs a logic OR of the output signal from the digitizer circuit 1003 and the output signal from the NOT circuit 1005. The address region identification section 10 having the structure shown in FIG. 9 generates the gate signal IDGATE so that it takes a "Hi" value in an address region on the optical disk, based on the high-band tracking error signal RFTE from the reproduction signal detector 4.

Figure 11A:
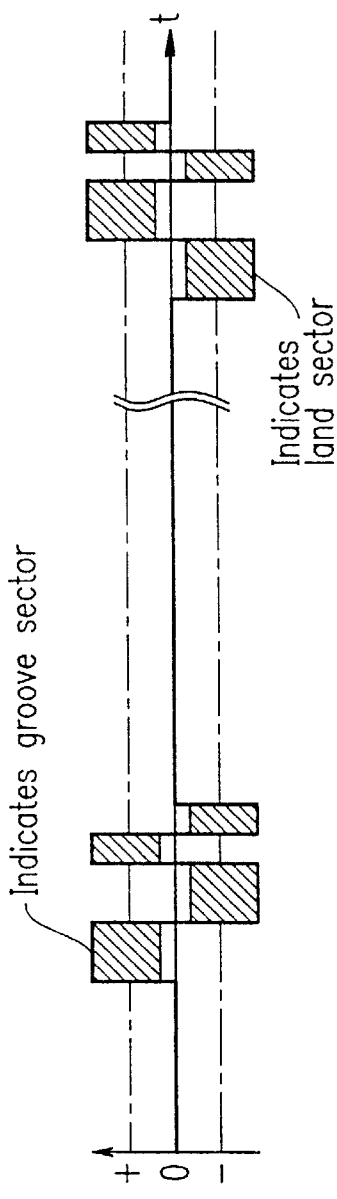
FIG. 11A is a waveform diagram illustrating the waveform of an RFTE signal received by an address region identification section 10 shown in FIG. 10.
Figure 11B:
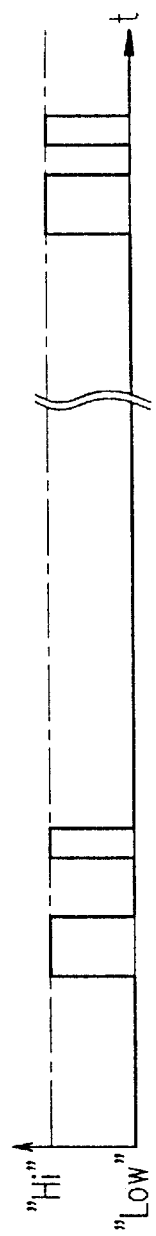
FIG. 11B is a waveform diagram illustrating the output from a digitization circuit 1003 in FIG. 10.

Next, the generation of the IDGATE signal will be described with reference to FIGS. 11A to 11D. FIG. 11A is a waveform diagram illustrating the waveform of the RFTE signal received by the address region identification section 10. If the RFTE signal as shown in FIG. 11A is input to the address region identification section 10, the output signal from the digitizer circuit 1003 takes the "Hi" value while an address signal appears on the positive side of the zero level of the RFTE signal as shown in FIG. 11B, and also takes the "Hi" value while a reproduction signal of pits formed with a predetermined pitch which is equal to or smaller than $\lambda/NA$ appears on the positive side of the zero level of the RmT signal as shown in FIG. 11B. Otherwise, the output signal from the digitizer circuit 1003 takes the "Low" value.

Figure 11C:
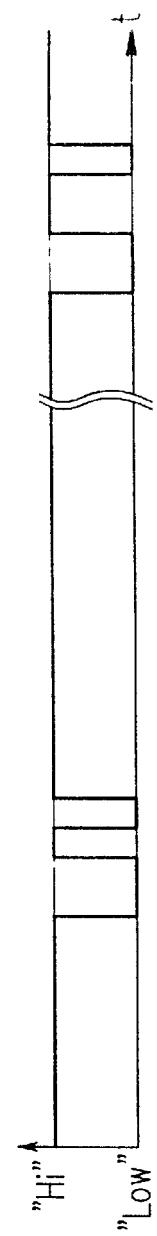
FIG. 11C is a waveform diagram illustrating the output from a digitization circuit 1004 in FIG. 10.

If the RFTE signal as shown in FIG. 11A is input to the address region identification section 10, the output signal from the digitizer circuit 1004 takes the "Low" value while an address signal appears on the negative side of the zero level of the RFTE signal as shown in FIG. 11C, and also takes the "Low" value while a reproduction signal of pits formed with a predetermined pitch which is equal to or smaller than $\lambda/NA$ appears on the negative side of the zero level of the RFTE signal as shown in FIG. 11C. Otherwise, the output signal from the digitizer circuit 1004 takes the "Hi" value.

Figure 11D:
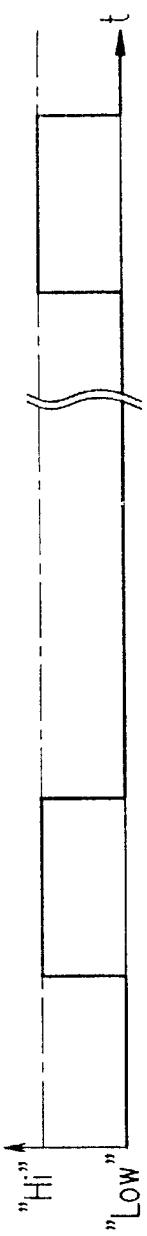
FIG. 11D is a waveform diagram illustrating the IDGATE output signal from an address region identification section shown in FIG. 10.

As a result, as shown in FIG. 11D, the output from the OR circuit 1006 (i.e., the IDGATE signal) takes the "Hi" value while an address signal or a reproduction signal of any pits formed with a predetermined pitch which is equal to or smaller than $\lambda/NA$ appears in the RFTE signal. Otherwise, the IDGATE signal takes the "Low" value.

Figure 12:
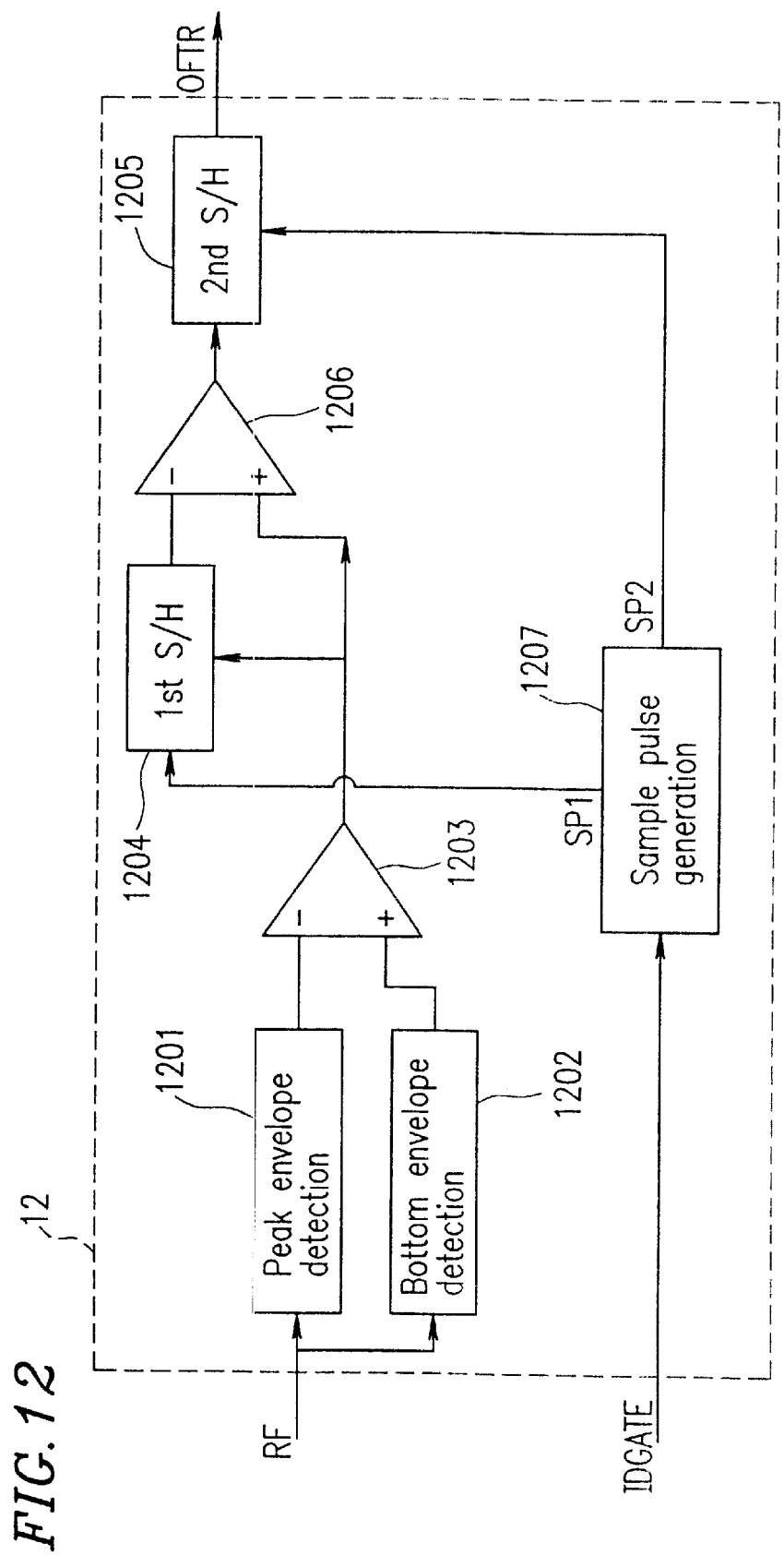
FIG. 12 is a block diagram illustrating the internal structure of an off-tracking detection section 12 described with reference to according to an example of the invention.

Next, the off-tracking detection section 12 will be described with reference to FIG. 12. FIG. 12 is a block diagram illustrating the internal structure of the off-tracking detection section 12.

A peat envelope detection section 1201 detects a peak envelope of the reproduction signal RF from the reproduction signal detector 4. A bottom envelope detection section 1202 detects a bottom envelope of the reproduction signal RF from the reproduction signal detector 4. A first differential amplifier circuit 1203 calculates the difference between the output signals from the peak envelope detection section 1201 and the bottom envelope detection section 1202 and outputs the calculated difference. A sample pulse generation section 1207 outputs a sample timing signal SP1 for a first sample/hold section 1204 and a sample timing signal SP2 for a second sample/hold section 1205. The first sample/hold section 1204 samples the output from the first differential amplifier circuit 1203 in accordance with the sample timing signal SP1 from the sample pulse generation section 1207, and holds the sampled result. A second differential amplifier circuit 1206 calculates the difference between the signal held in the first sample/hold section 1204 and the output signal from the first differential amplifier circuit 1203, and outputs the calculated difference. The second sample/hold section 1205 samples the output from the second differential amplifier circuit 1206 in accordance with the sample timing signal SP2 from the sample pulse generation section 1207 and holds the sampled result, which is output as an off-tracking detection signal OFTR.

Figure 13:
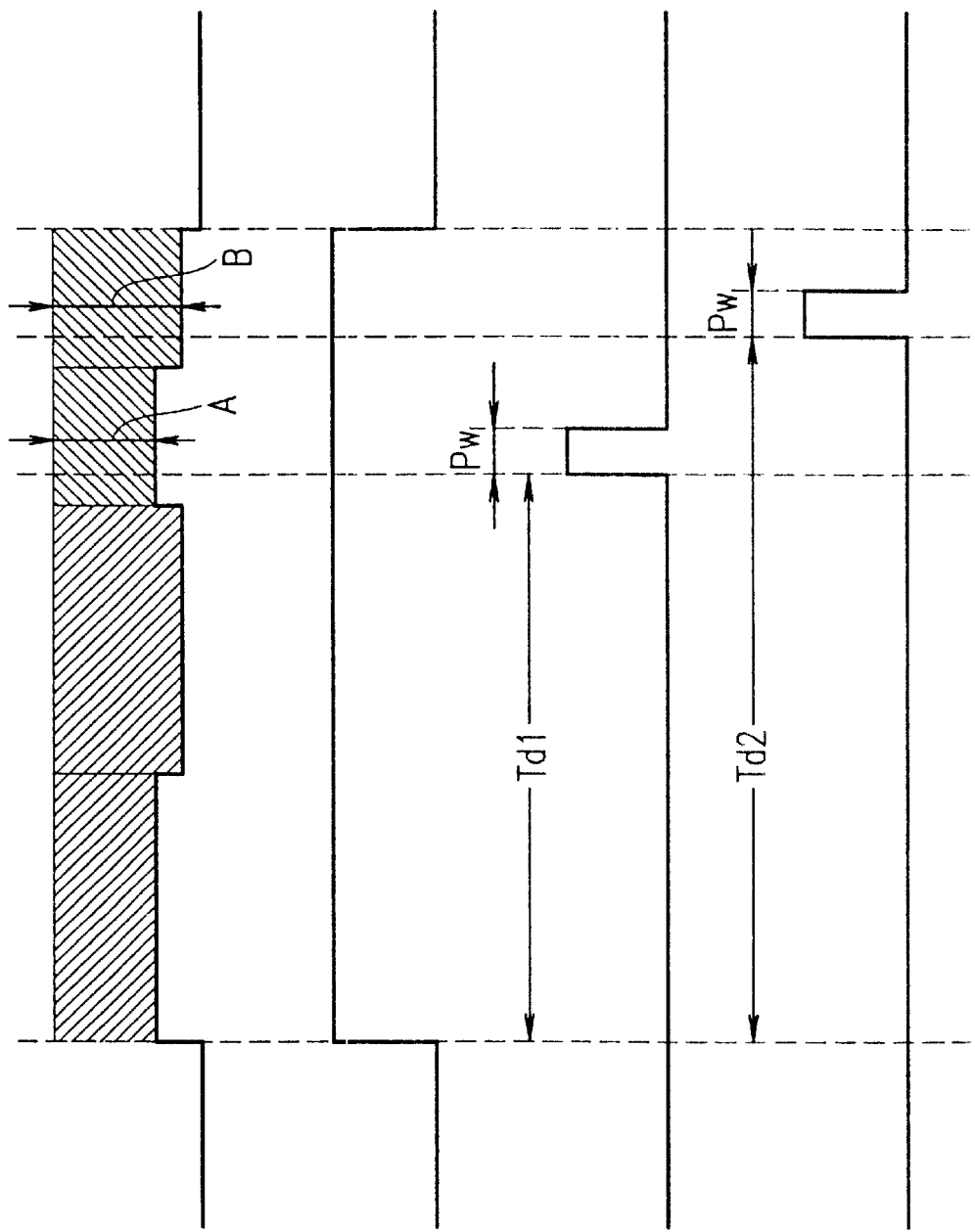
FIG. 13A is a waveform diagram illustrating a reproduction signal RF.
FIG. 13B is a waveform diagram illustrating an IDGATE signal.
FIG. 13C is a waveform diagram illustrating a sampling pulse SP1.
FIG. 13D is a waveform diagram illustrating a sampling pulse SP2.

The sampling timing which is controlled in accordance with the sampling pulses from the sample pulse generation section 1207 will be described with reference to FIGS. 13A to 13D. FIG. 13A is a waveform diagram illustrating the reproduction signal RF; FIG. 13B is a waveform diagram illustrating the IDGATE signal; FIG. 13C is a waveform diagram illustrating the sampling pulse SP1; and FIG. 13D is a wave form diagram illustrating the sampling pulse SP2.

As shown in FIG. 13C, the sampling pulse SP1 is a pulse signal whose level goes "Hi" for a period corresponding to a pulse width Pw after the lapse of time Td1 from a rising edge of the IDGATE signal. While the sampling pulse SP1 from the sample pulse generation section 1207 is at the "Hi" level, the first sample/hold section 1204 samples amplitude A of a reproduced signal from the first pit array (which are formed with a predetermined pitch which is equal to or smaller than $\lambda/NA$), and holds the value of amplitude A until reaching the next sampling time.

As shown in FIG. 13D, the sampling pulse SP2 is a pulse signal whose level goes "Hi" for a period corresponding to a pulse width Pw after the lapse of time Td2 from a rising edge of the IDGATE signal. While the sampling pulse SP2 from the sample pulse generation section 1207 is at the "Hi" level, the second sample/hold section 1205 samples the calculated difference between the output signal from the first sample/hold section 1204 and amplitude B of a reproduced signal from the second pit array (which are formed with a predetermined pitch which is equal to or smaller than $\lambda/NA$), and holds the sampled value until reaching the next sampling time. Thus, the off-tracking detection signal OFTR is obtained as an output signal from the off-tracking detection section 12.

Figure 14:
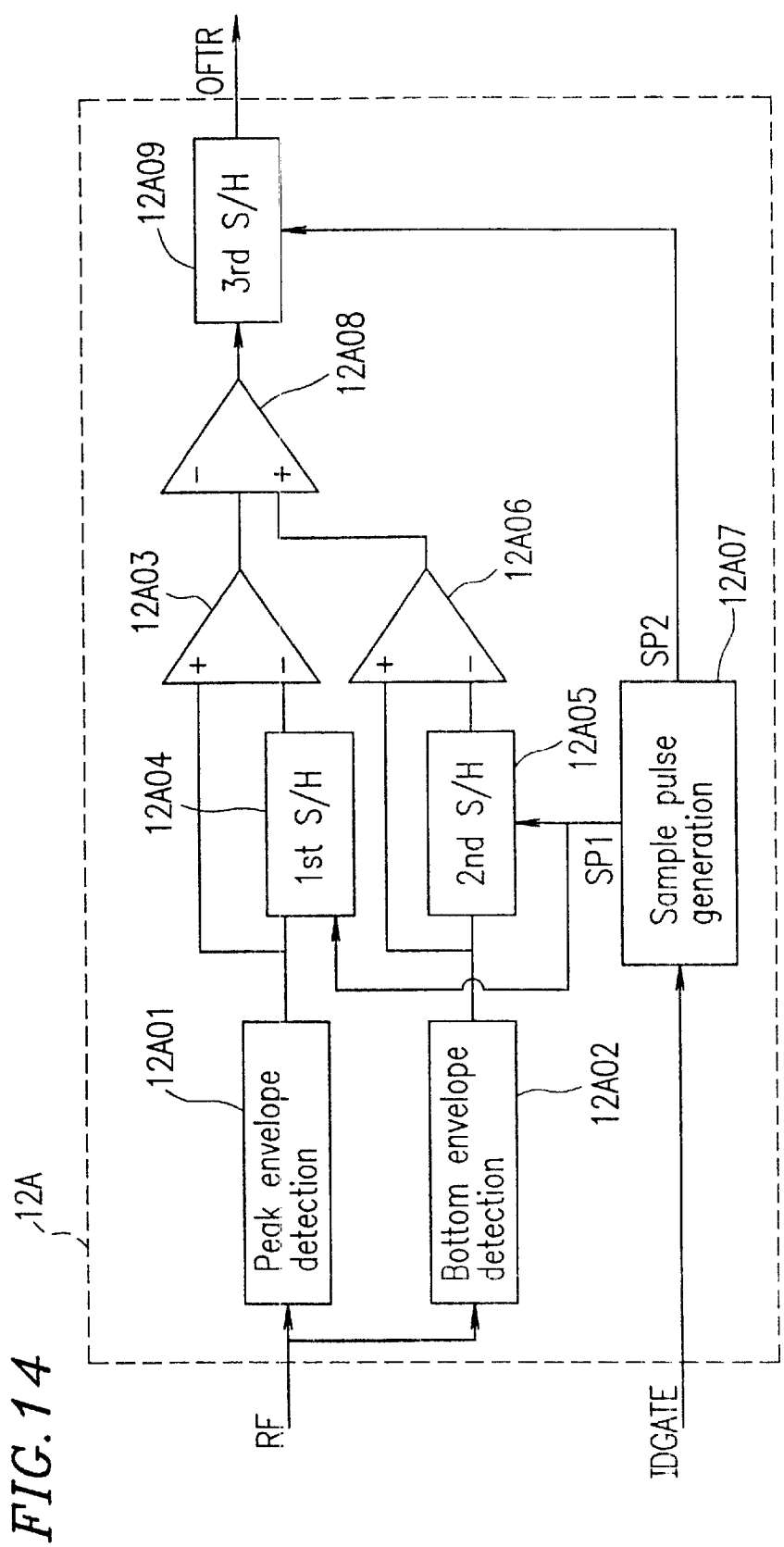
FIG. 14 is a block diagram illustrating the internal structure of a modified embodiment of an off-tracking detection section according to an example of the invention.

Next, another embodiment of the off-tracking detection section 12 will be described with reference to FIG. 14. FIG. 14 is a block diagram illustrating the internal structure of an off-tracking detection section 12A as one modification of the off-tracking detection section 12. A peak envelope detection section 12A01 detects a peak envelope of the reproduction signal RF from the reproduction signal detector 4. A bottom envelope detection section 12A02 detects a bottom envelope of the reproduction signal RF from the reproduction signal detector 4.

A sample pulse generation section 12A07 outputs a sample timing signal SP1 for a first sample/hold section 12A04 and a second sample/hold section 12A05, and a sample timing signal SP2 for a third sample/hold section 12A09. The first sample hold section 12A04 samples the output from the peak envelope detection section 12A01 in accordance with the sample timing signal SP1 from the sample pulse generation section 12A07, and holds the sampled result.

The second sample/hold section 12A05 samples the output from the bottom envelope detection section 12A02 in accordance with the sample timing signal SP1 from the sample pulse generation section 12A07, and holds the sampled result. A first differential amplifier circuit 12A03 calculates the difference between the output signals from the peak envelope detection section 12A01 and the first sample/hold section 12A04, and outputs the calculated difference. A second differential amplifier circuit 12A06 calculates the difference between the output signals from the bottom envelope detection section 12A02 and the second sample/hold section 12A05, and outputs the calculated difference. A third differential amplifier circuit 12A08 calculates the difference between the output signals from the first differential amplifier circuit 12A03 and the second differential amplifier circuit 12A06, and outputs the calculated difference. The third sample/hold section 12A09 samples the output from the third differential amplifier circuit 12A08 in accordance with the sample timing signal SP2 from the sample pulse generation section 12A07 and holds the sampled result, which is output as an off-tracking detection signal OFTR.

The sample pulse generation section 12A07 has functions similar to those of the sample pulse generation section 1207 in the off-tracking detection section 12. The sample timing signal SP1 and SP2 are also similar to that described with reference to FIG. 12. Therefore, the description thereof is omitted.

The internal structure of the off-tracking detection section, as shown in 12 and 12A, is not limited to that described above. The off-tracking detection section 12 may have any other internal structure so long as it provides functions similar to those described above.

Next, the relationship between radial tilt and the off-tracking detection signal OFTR, which is detected from reproduction signals from pits formed with a predetermined pitch which is equal to or smaller than $\lambda/NA$, will be described with reference to FIGS. 15, 16, and 17.

Figure 15:
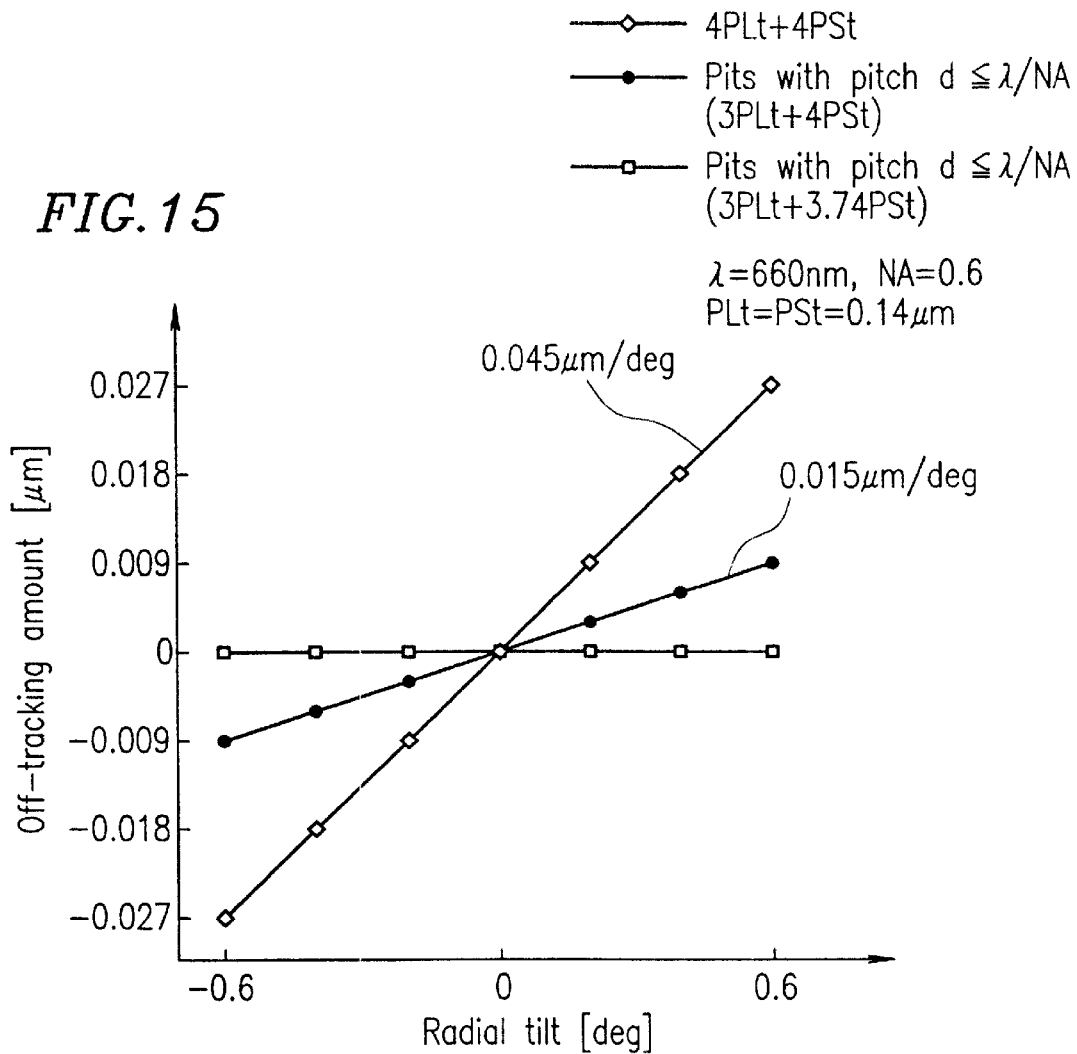
FIG. 15 is a graph illustrating the relationship between radial tilt and off-tracking under the conditions that $\lambda$=about 660 nm and NA=about 0.6, with respect to a case of forming pits with a pitch which is larger than $\lambda/NA$ and a case of forming pits with a pitch which is equal to or smaller than $\lambda/NA$.

FIG. 15 illustrates the relationship between radial tilt and off-tracking (i.e., offset of a light beam from a track center) under the conditions that the light beam wavelength $\lambda$ is about 660 nm and that the objective lens numerical aperture NA is about 0.6, with respect to a case of forming pits with a pitch which is larger than $\lambda/NA$ and a case of forming pits with a pitch which is equal to or smaller than $\lambda/NA$. FIG. 16 illustrates the relationship between radial tilt and off-tracking under the conditions that the light beam wavelength $\lambda$ is about 425 nm and that the objective lens numerical aperture NA is about 0.6, with respect to a case of forming pits with a pitch which is larger than $\lambda/NA$ and a case of forming pits with a pitch which is equal to or smaller than $\lambda/NA$, FIG. 17 illustrates the relationship between off-tracking and the off-tracking detection signal OFTR.

The horizontal axis and the vertical a is of the graph of FIG. 15 represent radial tilt (deg) and off-tracking amount ($\mu$m), respectively. In FIG. 15, the data indicated with ◇ symbols and a solid line illustrates the case where pits are formed whose lengths are equivalent to four times a reference pit length PLt and which are spaced from one another by a distance equivalent to four times a reference pit space PSt, assuming that the length PLt of a reference pit whose reproduction time equals the reproduction reference T is about 0.14 $\mu$m, and that the space PSt between the reference pits is about 0.14 $\mu$m; in this case, the pit pitch 1.12 $\mu$m, which is larger than $\lambda/NA$. When the position of the light beam is controlled so as to equalize the amplitudes of reproduction signals from such pits formed with a pitch of about 1.12 $\mu$m, an off-tracking of about 0.045 $\mu$m is caused for every 1 degree of radial tilt.

In FIG. 15, the data indicated with ● symbols and a solid line illustrates the case where pits are formed whose lengths are equivalent to three times the reference pit length PLt and which are spaced from one another by a distance equivalent to four times the reference pit space PSt; in this case, the pit pitch 0.98 $\mu$m, which is smaller than $\lambda/NA$. When the position of the light beam is controlled so as to equalize the amplitudes of reproduction signals from such pits formed with a pitch of about 0.98 $\mu$m. an off-tracking of about 0.015 $\mu$m is caused for every 1 degree of radial tilt.

In FIG. 15, the data indicated with □ symbols and a solid line illustrates the case where pits are formed whose lengths are equivalent to three times the reference pit length PLt and which are spaced from one another by a distance equivalent to 3.74 times the reference pit space PSt; in this case, the pit pitch 0.9436 μm, which is smaller than λ/NA. This pit pitch of about 0.9436 μm is substantially equal to the pitch d (=about 0.944 μm) which minimizes the influence of a radial tilt under the conditions that (as has been described with reference to FIG. 3) the light beam has a wavelength λ of about 660 nm, the objective lens has a numerical aperture NA of about 0.6; the groove width GW is about 0.4 μm; a taper width of about 0.05 μm is used for the groove formation; and the groove pitch Λr is about 1.2 μ. Thus, when the position of the light beam is controlled so as to equalize the amplitudes of reproduction signals from such pits formed with a pitch of about 0.9436 μm, substantially no off-tracking is caused by any radial tilt.

Figure 16:
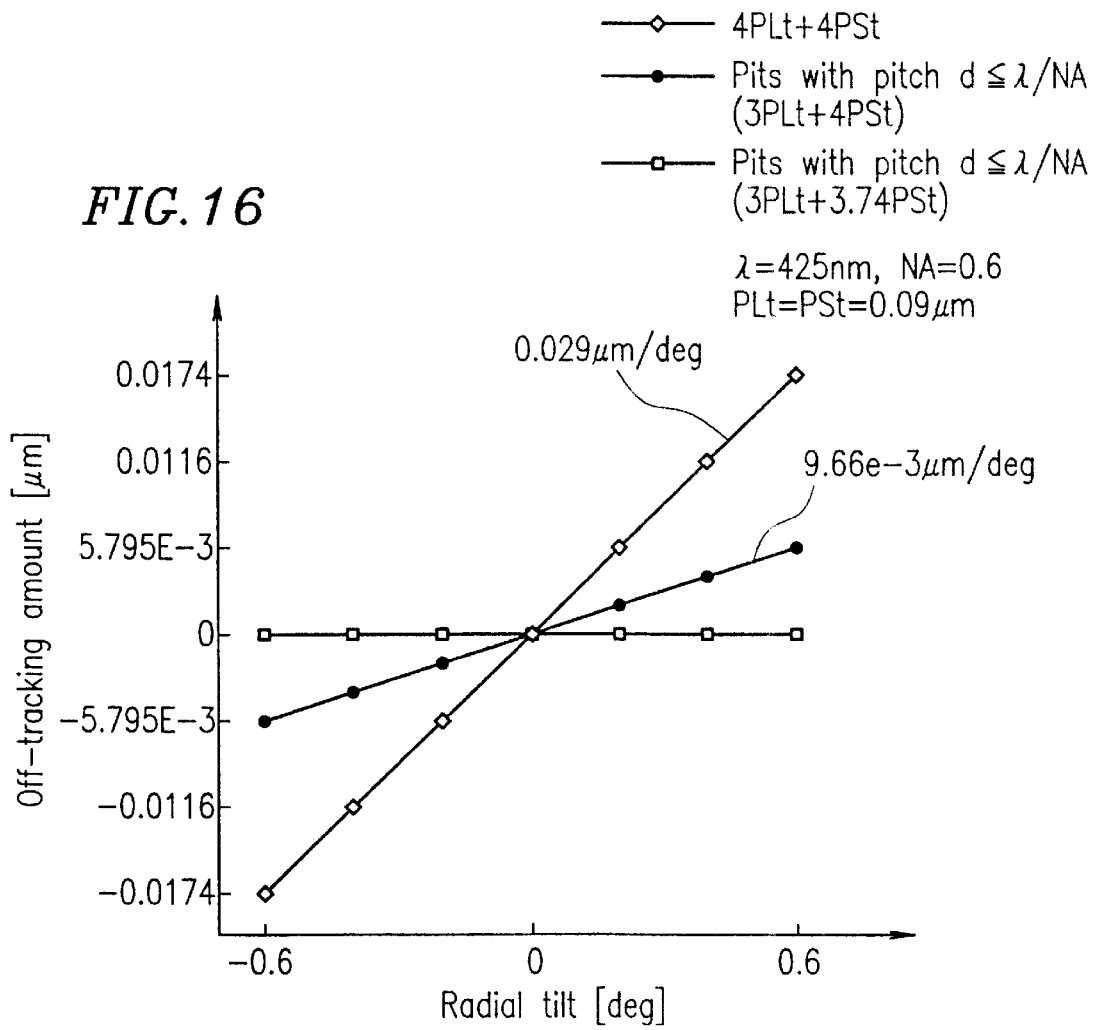
FIG. 16 is a graph illustrating the relationship between radial tilt and off-tracking under the conditions that λ=about 425 nm and NA=about 0.6, with respect to a case of forming pits with a pitch which is larger than λ/NA and a case of forming pits with a pitch which is equal to or smaller than λ/NA.

The horizontal axis and the vertical axis of the graph of FIG. 16 represent radial tilt (deg) and off-tracking amount (μm), respectively. In FIG. 16, the data indicated with ◇ symbols and a solid line illustrates the case where pits are formed whose lengths are equivalent to four times a reference pit length PLt and which are spaced from one another by a distance equivalent to four times a reference pit space PSt, assuming that the length PLt of a reference pit whose reproduction time equals the reproduction reference T is about 0.09 μm, and that the space PSt between the reference pits is about 0.09 μm; in this case, the pit pitch 0.72 μm, which is larger than λ/NA. When the position of the light beam is controlled so as to equalize the amplitudes of reproduction signals from such pits formed with a pitch of about 0.72 μm, an off-tracking of about 0.029 μm is caused for every 1 degree of radial tilt.

In FIG. 16, the data indicated with ● symbols and a solid line illustrates the case where pits are formed whose lengths are equivalent to three times the reference pit length PLt and which are spaced from one another by a distance equivalent to four times the reference pit space PSt; in this case, the pit pitch 0.63 μm, which is smaller than λ/NA. When the position of the light beam is controlled so as to equalize the amplitudes of reproduction signals from such pits formed with a pitch of about 0.63 μm, an off-tracking of about $9.66 \times 10^{-3}$ μm is caused for every 1 degree of radial tilt.

In FIG. 16, the data indicated with □ symbols and a solid line illustrates the case where pits are formed whose lengths are equivalent to three times the reference pit length PLt and which are spaced from one another by a distance equivalent to 3.74 times the reference pit space PSt; in this case, the pit pitch 0.607 μm, which is smaller than λ/NA. This pit pitch of about 0.607 μm is substantially equal to the pitch d (=about 0.608 μm) which minimizes the influence of a radial tilt under the conditions that (as has been described with reference to FIGS. 4, 6, eq. 12, eq. 14, and eq. 16) the light beam has a wavelength λ of about 425 nm; the objective lens has a numerical aperture NA of about 0.6; and the groove pitch Λr is about 0.77 μm. Thus, when the position of the light beam is controlled so as to equalize the amplitudes of reproduction signals from such pits formed with a pitch of about 0.607 μm, substantially no off-tracking is caused by any radial tilt.

In the graph of FIG. 17, the horizontal axis and the vertical axis represent, respectively, the off-tracking amount (μm) and the off-tracking detection signal OFTR (%) as detected based on a difference in amplitude between reproduction signals from pits formed with a predetermined pitch which is equal to or smaller than λ/NA. The amount and polarity of off-tracking of a light beam with respect to a track center can be determined in accordance with this graph. The off-tracking detection characteristics shown in FIG. 17 illustrate the case where pits are formed whose lengths are equivalent to three times the reference pit length PLt and which are spaced from one another by a distance equivalent to four times the reference pit space PSt, under the conditions that the light beam has a wavelength λ of about 660 nm; and the objective lens has a numerical aperture NA of about 0.6, so that the pit pitch d is about 0.98 μm. In this case, a detection sensitivity of about 0.124 is provided per 1 μm of off-tracking. The off-tracking detection rate (OFTR) is virtually 0% when the off-tracking of the light beam from a track center is zero.

In the graph of FIG. 17, the off-tracking detection rate (%) is normalized by the percentage reflectance of the pits forced with a predetermined pitch which is equal to or smaller than λ/NA, against the reflectance (=100%) of the entire reflective surface of the optical disk.

As shown in FIGS. 15, 16, and 17, by detecting the off-tracking based on a difference in amplitude between reproduction signal a from pits formed with a predetermined pitch which is equal to or smaller than λ/NA, the amount and polarity of off-tracking of a light beam from a track center can be detected, with minimum influence of off-tracking due to a radial tilt.

Based on the off-tracking detection signal OFTR from the off-tracking detection section 12, the off-tracking compensation control section 13 controls the detection balance of the tracking error signal which is detected by the tracking error detection section 5B, and changes the target position of the tracking servo control so that the off-tracking detection signal OFTR becomes zero, i.e., so that the off-tracking of the light beam converged on the optical disk with respect to the center of a target track becomes zero.

Alternatively, based on the off-tracking detection signal OFTR from the off-tracking detection section 12, the off-tracking compensation control section 13 controls the offset of the tracking error signal which is detected by the tracking error detection section 5B, and changes the target position of the tracking servo control so that the off-tracking detection signal OFTR becomes zero.

Next, an optical disk including address regions and pits formed with a predetermined pitch which is equal to or smaller than λ/NA, such that a first pit array is formed in a PLL synchronization region for a reproduction clock that is provided in a second address region and a second pit array is formed in a PLL synchronization region for a reproduction clock that is provided in a fourth address region will be described with reference to FIGS. 18A and 18B.

Figure 18A:
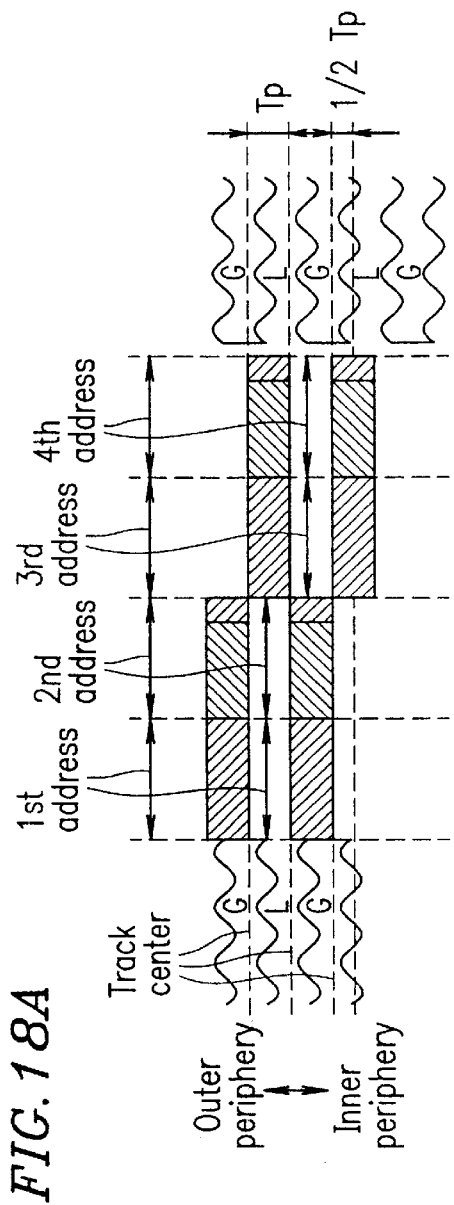
FIG. 18A is a block diagram schematically illustrating an optical disk including address regions such that a first pit array is formed in a PLL synchronization region for a reproduction clock that is provided in a second address region and a second pit array is formed in a PLL synchronization region for a reproduction clock that is provided in a fourth address region.

FIG. 18A is a block diagram schematically illustrating an optical disk including address regions and pits formed with a predetermined pitch which is equal to or smaller than λ/NA, such that a first pit array is formed in a PLL synchronization region for a reproduction clock that is provided in a second address region and a second pit array is formed in a PLL synchronization region for a reproduction clock that is provided in a fourth address region. FIG. 18B is a more detailed block diagram illustrating the structure of the first, second, third, and fourth addresses.

As shown in FIG. 18A, the first, second, third, and fourth addresses are provided in this order. The first and second addresses are each located at a position which is shifted from the end of a groove track toward the outer periphery side by ½ of the track pitch. The third and fourth address regions are each located at a position which is shifted from the end of a groove track toward the inner periphery side by ½ of the track pitch.

Figure 18B:
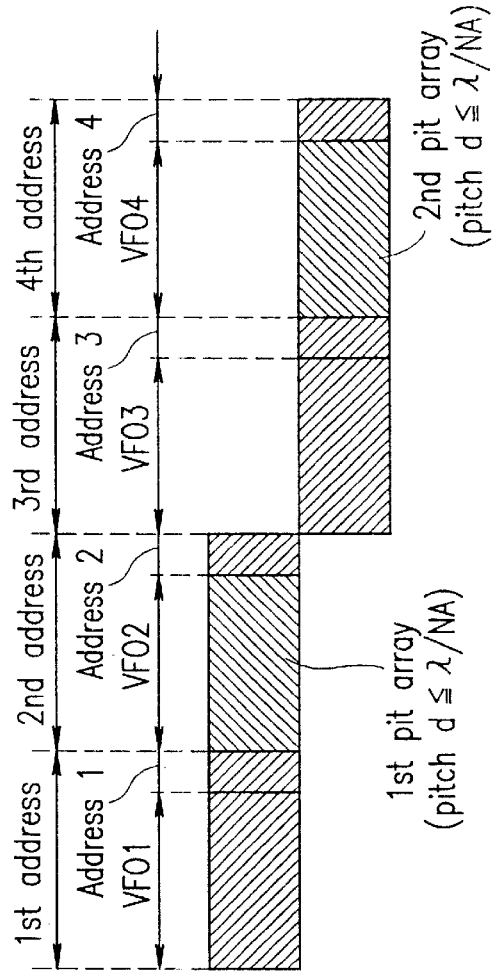
FIG. 18B is a more detailed block diagram illustrating the structure of the first, second, third, and fourth addresses.
Figure 19A:
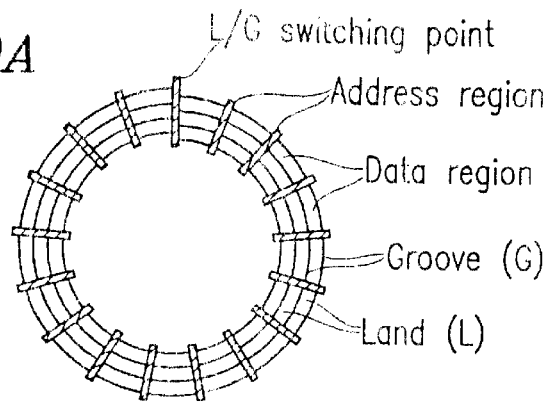
FIG. 19A is a plan view illustrating a single spiral structure.
Figure 19B:
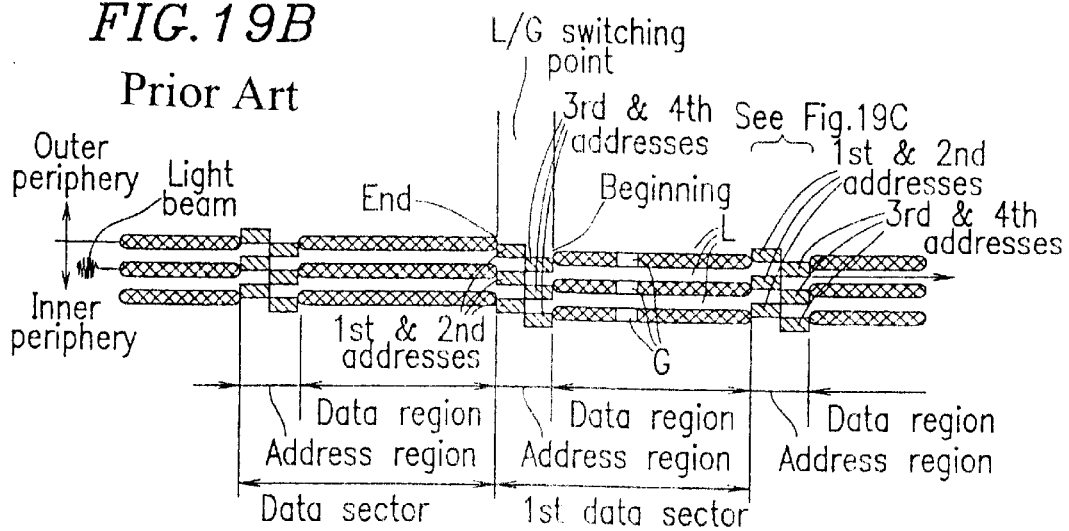
FIG. 19B is an enlarged view showing the L/G switching point in FIG. 19A.
Figure 19C:
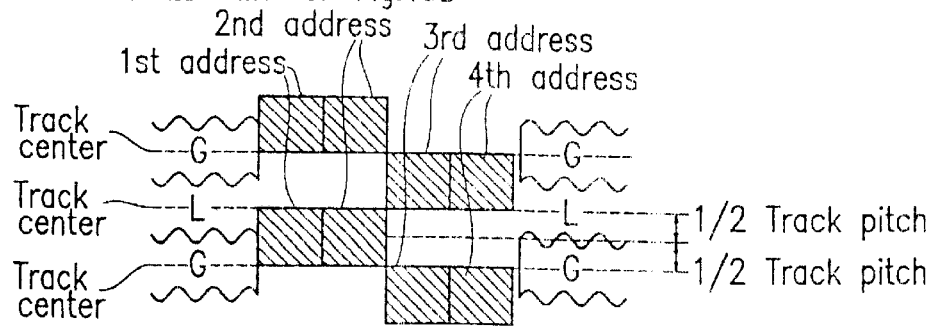
FIG. 19C is a further enlarged view of the vicinity of an address region which does not correspond to a L/G switching point in FIG. 19B.
Figure 20A:
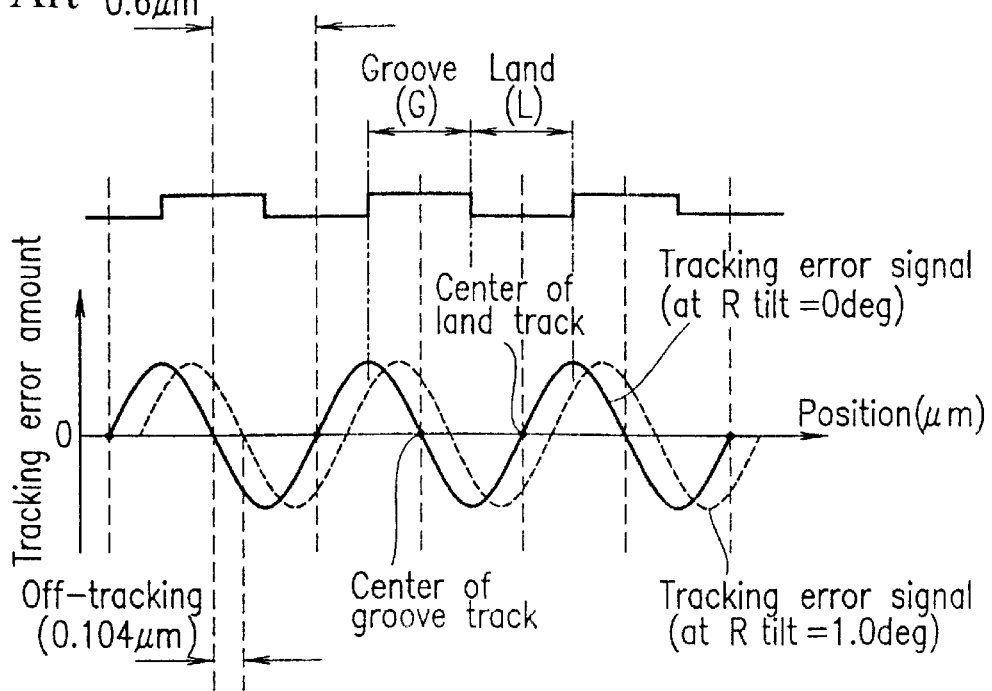
FIG. 20A is a diagram illustrating a tracking error signal which is obtained when a light beam crosses a track with zero radial tilt and a tracking error signal which is obtained when a light beam crosses a track with a radial tilt of 1.0 degree, shown against a cross section of an optical disk having land tracks and groove tracks.
Figure 20B:
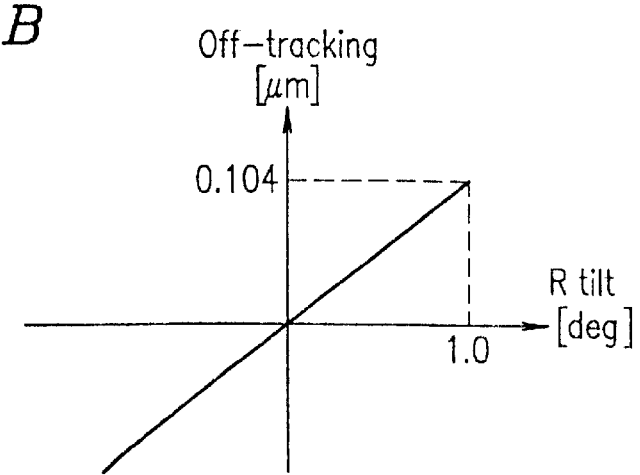
FIG. 20B is a graph illustrating the relationship between the optical disk tilt along the radial direction and off-tracking, where tracking servo control is performed based on a push-pull TE.

As shown in FIG. 18B, the first, second, third, and fourth addresses each include a VFO region (which is a region for PLL synchronization for a reproduction clock) and an address. The first pit array, which is formed with a predetermined pitch which is equal to or smaller than λ/NA, is provided in the PLL synchronization region VFO2 in the second address. The second pit array, which is formed with a predetermined pitch which is equal to or smaller than λ/NA, is provided in the PLL synchronization region VFO4 in the fourth address.

Figure 7:
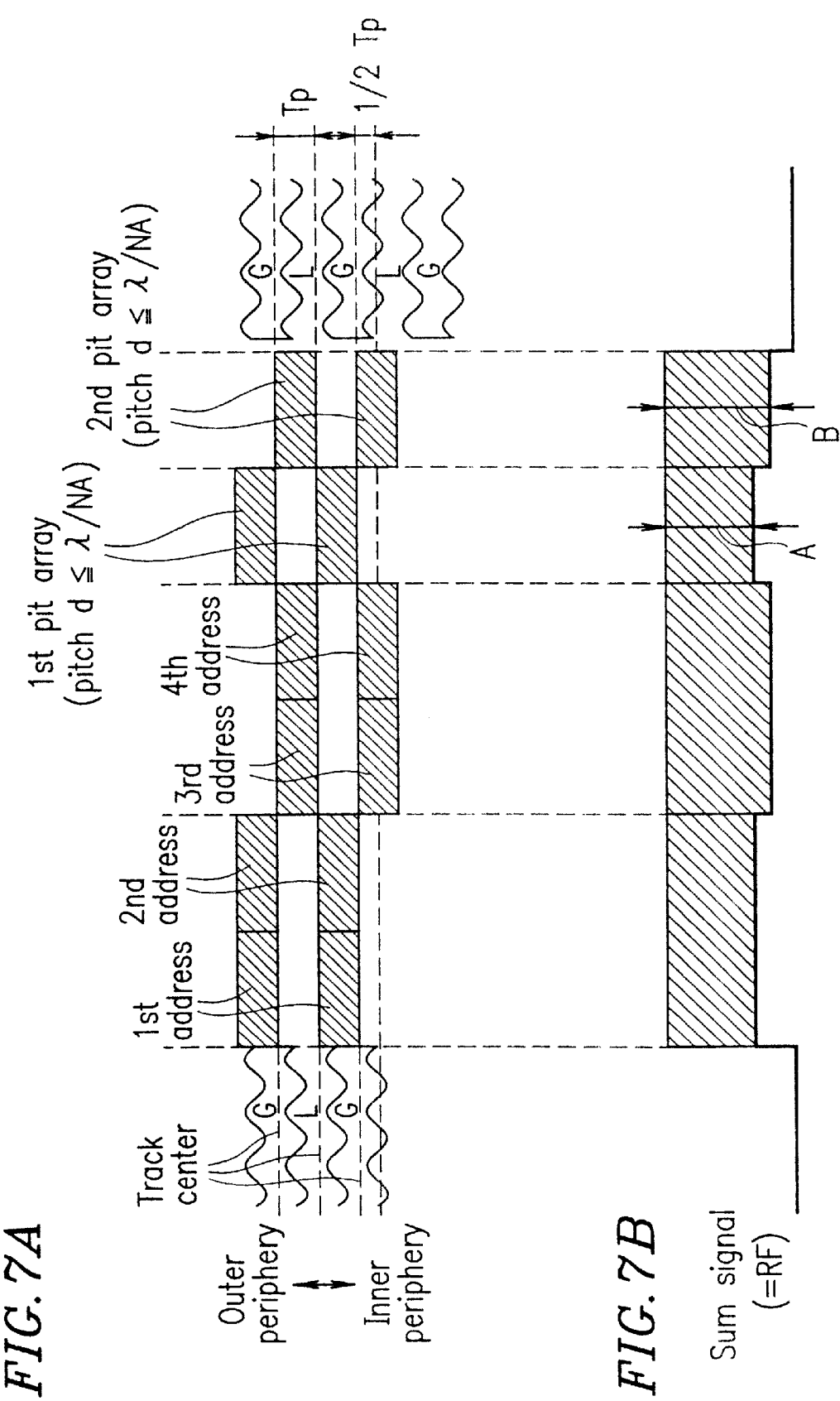
FIG. 7A is a block diagram schematically illustrating an optical disk according to the present invention.
FIG. 7B is a waveform diagram illustrating a reproduction signal RF which is based on reproduction signals from pits which are formed with a predetermined pitch which is equal to or smaller than $\lambda/NA$.

In the case of pit arrays are formed with a predetermined pitch which is equal to or smaller than λ/NA in the manner shown in FIG. 18, too, it becomes possible, by prescribing a delay time from the point of address region detection and the point of sampling, to obtain an off-tracking detection signal based on a difference in amplitude between a reproduction signal obtained when the light beam passes over the first pit array formed with a predetermined pitch which is equal to or smaller than λ/NA and a reproduction signal obtained when the light beam passes over the second pit array formed with a predetermined pitch which is equal to or smaller than λ/NA, just like in the case of an optical disk having pit arrays formed with a predetermined pitch which is equal to or smaller than λ/NA as shown in FIG. 7. Furthermore, a larger recording capacity can be provided by the aforementioned optical disk, including address regions and pits formed with a predetermined pitch which is equal to or smaller than λ/NA, such that a first pit array is formed in a PLL synchronization region for a reproduction clock that is provided in a second address region and a second pit array is formed in a PLL synchronization region for a reproduction clock that is provided in a fourth address region, because it is unnecessary to separately provide first and second pit arrays having a predetermined pitch which is equal to or smaller than λ/NA in addition to the first, second, third, and fourth addresses.

In the above example of the invention, two instances of an optical disk having pits formed with a predetermined pitch which is equal to or smaller than λ/NA are illustrated: an optical disk having pit arrays formed with a predetermined pitch which is equal to or smaller than λ/NA behind the fourth address in an address region; and an optical disk including address regions such that pit arrays are formed with a predetermined pitch which is equal to or smaller than λ/NA in PLL synchronization regions for a reproduction clock that are provided in address regions. However, the arrangement of the pit arrays formed with a predetermined pitch which is equal to or smaller than λ/NA is not limited thereto. For example, the same operation can be achieved by providing a pit array in between the first address and the second address and providing another pit array in between the third address and the fourth address, by prescribing a delay time from the point of address region detection and the point of sampling. Alternatively, even by providing pit arrays formed with a predetermined pitch which is equal to or smaller than λ/NA at positions which are distant from address regions, it is possible to achieve the same operation by prescribing a delay time from the point of address region detection and the point of sampling in accordance with the distance between each pit array and an address region.

Although a pit array arrangement with a pit length of 3 PLt and an interpit space of 4 PSt is described above as one instance of a pit array formed with a predetermined pitch which is equal to or smaller, than λ/NA, the present invention is not limited thereto. It will be appreciated that similar effects can be attained by an alternative pit array arrangement, e.g., with a pit length of 4 PLt and an interpit space of 3 Pst, as long as each pit array is formed with a predetermined pitch which is equal to or smaller than λ/NA.

Although the above example illustrates an 8–16 modulation method as a modulation method for recording information on an optical disk or reproducing information recorded on an optical disk, the present invention is not limited thereto, as described below.

In the above example of the invention, the pitch d which minimizes the influence of a radial tilt is about 0.944 μm under the conditions that the light beam has a wavelength λ of about 660 nm; the objective lens has a numerical aperture NA of about 0.6; the groove width GW is about 0.4 μm; a taper width of about 0.05 μm is used for the groove formation: and the groove pitch Λr is about 1.2 μm.

On the other hand, the sub-OTF critical pitch $d_{co}$ (defined above) is λ/(2NA), as has been described with reference to eq. 7. Therefore, the sub-OTF critical pitch $d_{co}$ under the conditions λ=about 660 nm and NA=about 0.6 is about 0.55 μm.

Assuming that the pit length and interpit space are substantially equal, the sub-OTF critical pit length will be 1/2 sub-OTF critical pitch $d_{co}$=about 0.275 μm.

In the case of an 8–16 modulation method, the reproduction time of a shortest pit is 3 T, where T represents the reproduction clock cycle. In general, the shortest pit length is prescribed at a larger value than the sub-OTF critical pit length. In the above example of the present invention, the shortest pit length is about 0.42 μm, and the reference pit length whose reproduction time equals T is about 0.14 μm.

Therefore, the reference pit length is about 0.14 μm in the case of an 8–16 modulation method illustrated in the above example of the present invention. Accordingly, if the pitch d which minimizes the influence of a radial tilt is approximated as a multiple of the reference pit length under an 8–16 modulation method by an integer k, the pitch d gives 0.98 μm (which is the closest value to the d value which actually minimizes the influence of a radial tilt) under k=7. Assuming that the integer k can be expressed as a sum of an integer n and an integer m (i.e. k=n+m), the effects of the present invention can be attained by using a pit array arrangement such that the reproduction time of each pit formed with a predetermined pitch which is equal to or smaller than λ/NA equals n times the reproduction time of the shortest pit and that the reproduction time of an interpit space equals m times the reproduction time of the shortest pit, for a substantially optimum total pitch d. In prescribing such a pit array arrangement, neither the pit length nor the interspace may be smaller than the shortest pit length. In other words, it is preferable to prescribe n and m so that both the pit length and the interspace become larger than about 0.275 μm (i.e., the sub-OTF critical pit length). Since the reference pit length under an 8–16 modulation method in the above example of the present invention is about 0.14 μm, both n and m is preferably 3 or more. Since k=7, either "n=3 and m=4" or "n=4 and m=30" may be used.

While the reproduction time of a shortest pit under an 8–16 modulation method is 3 T, where T represents the reproduction clock cycle, the reproduction time of a shortest pit under a 2–7 modulation method is 1.5 T, for example. Thus, the reproduction time of the shortest pit varies depending on the modulation method.

Now, assuming that the shortest pit under a 2–7 modulation method is the same as that under an 8–16 modulation method, i.e., 0.42 μm, the reference pit length will be 0.42 μm×1/1.5=about 0.28 μm. Then, if the pitch d which minimizes the influence of a radial tilt is approximated as a multiple of the reference it length under a 2–7 modulation method by an integer k, the pitch d gives 0.84 μm (which is the closest value to the d value which actually minimizes the influence of a radial tilt) under k=3.

A 2–7 modulation method is described in "FUNDAMENTAL STUDY OF HDD" published by K. K. Torikkepusu (Mar. 3, 1992). Therefore, any detailed description of this method is omitted herein.

Thus, the predetermined pitch d which is equal to or smaller than λ/NA, with which the pits according to the present invention are formed, can be determined by using the integer k such that a multiple by k of the reference pit length (which is known to differ depending on the modulation method) approximates the pitch d which minimizes the influence of a radial tilt. Assuming that the integer k can be expressed as a sum of an integer n and an integer m (i.e., k=n+m), the effects of the present invention can be attained by using a pit array arrangement such that the reproduction time of each pit formed with a predetermined pitch which is equal to or smaller than λ/NA equals n times the reproduction time of the shortest pit and that the reproduction time of an interpit space equals m times the reproduction time of the shortest pit, for a substantially optimum total pitch d. In prescribing such a pit array arrangement, neither the pit length nor the interspace may be smaller than the shortest pit length. In other words, it is preferable to prescribe n and m so that both the pit length and the interspace become larger than about 0.275 μm (i.e., the sub-OTF critical pit length). Since the reference pit length under a 2–7 modulation method is about 0.28 μm, both n and m are preferably 1 or more. Since k=3, either "n=1 and m=2" or "n=2 and m=1" may be used.

As described above, under any modulation method other than an 8–16 modulation method, an optical disk according to the present invention can be easily produced by approximating the predetermined pitch d (which is equal to or smaller than λ/NA) as a multiple by a certain integer of the reference pit length (which is known to differ depending on the modulation method).

Although the above example of the present invention illustrates an single spiral land groove format (SS-L/GFMT) disk having pits formed with a predetermined pitch which is equal to or smaller than λ/NA as an instance of an optical disk having pits formed with a predetermined pitch which is equal to or smaller than λ/NA, the present invention is not limited thereto. For example, the same effects can be attained by employing an optical disk having a continuous groove track so as to provide a first pit array with a predetermined pitch which is equal to or smaller than λ/NA at a position which is shifted in one of two directions substantially perpendicular to the groove track and provide a second pit array with a predetermined pitch which is equal to or smaller than λ/NA at a position which is shifted in the other direction which is substantially perpendicular to the groove track.

In accordance with an optical disk having pits formed with a predetermined pitch which is equal to or smaller than λ/NA and an optical disk apparatus employing the same, it is possible to highly accurately control a light beam with respect to a track center, whereby excellent recording/reproduction characteristics can be attained.

Thus, in accordance with the present invention, the tracking position can be compensated for by using an off-tracking detection signal which is detected based on a difference in amplitude between reproduction signals from pits which are formed with a predetermined pitch which is equal to or smaller than λ/NA so as to be shifted by a predetermined amount with respect to a track center. As a result, the present invention solve the problems associated with conventional techniques, i.e., occurrence of off-tracking in the presence of tracking servo based on a tracking error (TE) signal detected by a push-pull method, which is caused by an offset between the zero position of the push-pull TE signal and the actual track center, which in turn is caused by an offset in the optical axes of the optical disk surface and a light beam. Thus, the present invention makes it possible to highly accurately control the light beam with respect to a track center, whereby excellent recording/reproduction characteristics can be attained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk comprising tracks and grooves, the grooves being formed with a pitch equal to or greater than about λ/NA, wherein a first array of pits is provided at a position which is shifted by a predetermined amount with respect to each track in one of two directions substantially perpendicular to the tracks, the first array of pits being formed with a predetermined pitch taking a value which is equal to or less than about λ/NA in a direction parallel to a circumference of the optical disk, and such that gaps exist between adjacent pits in the first array, wherein a second array of pits is provided at a position which is shifted by a predetermined amount with respect to the track in the other one of the two directions substantially perpendicular to the tracks, the second array of pits being formed with a predetermined pitch taking a value which is equal to or less than about λ/NA in a direction parallel to a circumference of the optical disk, and such that gaps exist between adjacent pits in the second array, wherein λ is a wavelength of a light beam which is radiated on the optical disk; and NA is a numerical aperture of a lens.

2. An optical disk according to claim 1, wherein the first array of pits and the second array of pits are provided between an address region and a data region, the address region being used for recording information indicating one of the tracks on the optical disk, and the data region being used for recording data.

3. An optical disk according to claim 1, wherein the optical disk includes:

a first address region formed at a position which is shifted by a predetermined amount with respect to each track in the one of the two directions substantially perpendicular to the tracks, location information of one of the tracks being recorded in the first address region; and a second address region formed at a position which is shifted by a predetermined amount with respect to each track in the other one of the two directions substantially perpendicular to the tracks, the first address region and the second address region each including a PLL synchronization region for generating a reproduction clock, and wherein the first array of pits is provided in the PLL synchronization region in the first address region; and the second array of pits is provided in the PLL synchronization region in the second address region.

4. An optical disk according to claim 1, wherein each pit in the first array of pits has a shape which is substantially identical with a shape of each pit in the second array of pits.

5. An optical disk according to claim 1, wherein a reproduction time of a pit in the first array of pits is n times as large as a reproduction clock cycle;

wherein a reproduction time of a pit in the second array of pits is n times as large as the reproduction clock cycle;

wherein a reproduction time of a space between adjoining pits in the first array of pits is m times as large as the reproduction clock cycle; and wherein a reproduction time of a space between adjoining pits in the second array of pits is m times as large as the reproduction clock cycle, where n and m are natural numbers.

6. An optical disk comprising tracks and grooves, the grooves being formed with a pitch equal to or greater than about λ/NA, wherein a first array of pits is provided at a position, which is shifted by a predetermined amount with respect to each track in one of two directions substantially perpendicular to the tracks, the first array of pits being formed with a predetermined pitch taking a value within a range from about 0 to about λ/NA in a circumferential direction of the optical disk, wherein a second array of pits is provided at a position which is shifted by a predetermined amount with respect to the track in the other one of the two directions substantially perpendicular to the tracks, the second array of pits being formed with a predetermined pitch taking a value within the range from about 0 to about λ/NA in a circumferential direction of the optical disk, wherein λ is a wavelength of a light beam which is radiated on the optical disk; and NA is a numerical aperture of a lens, wherein a reproduction time of a pit in the first array of pits is n times as large as a reproduction clock cycle, wherein a reproduction time of a space between adjoining pits in the first array of pits is m times as large as the reproduction clock cycle, wherein a reproduction time of a space between adjoining pits in the second array of pits is m times as large as the reproduction clock cycle, where n and m are natural numbers, and wherein n is 3 and m is 4.

7. An optical disk comprising tracks and grooves, the grooves being formed with a pitch equal to or greater than about λ/NA, wherein a first array of pits is provided at a position, which is shifted by a predetermined amount with respect to each track in one of two directions substantially perpendicular to the tracks, the first array of pits being formed with a predetermined pitch taking a value within a range from about 0 to about λ/NA in a circumferential direction of the optical disk, wherein a second array of pits is provided at a position which is shifted by a predetermined amount with respect to the track in the other one of the two directions substantially perpendicular to the tracks, the second array of pits being formed with a predetermined pitch taking a value within the range from about 0 to about λ/NA in a circumferential direction of the optical disk, wherein λ is a wavelength of a light beam which is radiated on the optical disk; and NA is a numerical aperture of a lens, wherein a reproduction time of a pit in the first array of pits is n times as large as a reproduction clock cycle, wherein a reproduction time of a pit in the second array of pits is m times as large as the reproduction clock cycle, wherein a reproduction time of a space between adjoining pits in the second array of pits is m times as large as the reproduction clock cycle, where n and m are natural numbers, and wherein n is 4 and m is 3.

8. An optical disk comprising tracks and grooves, the grooves being formed with a pitch equal to or greater than about λ/NA, wherein a first array of pits is provided at a position which is shifted by a predetermined amount with respect to each track in one of two directions substantially perpendicular to the tracks, the first array of pits being formed with a predetermined pitch taking a value which is equal to or less than about λ/NA in a circumferential direction of the optical disk, and such that gaps exist between adjacent pits in the first array, wherein a second array of pits is provided at a position which is shifted by a predetermined amount with respect to the track in the other one of the two directions substantially perpendicular to the tracks, the second array of pits being formed with a predetermined pitch taking a value which is equal to or less than about λ/NA in a circumferential direction of the optical disk, and such that gaps exist between adjacent pits in the second array, wherein λ is a wavelength of a light beam which is radiated on the optical disk, and NA is a numerical aperture of a lens, wherein the predetermined pitch of the first array of pits is in the range of about 0.96 μm to about 1.035 μm;

wherein the predetermined pitch of the second array of pits is in the range of about 0.96 μm to about 1.035 μm;

wherein λ is about 660 nm; and wherein NA is about 0.6.

9. An optical disk comprising tracks and grooves, the grooves being formed with a pitch equal to or greater than about λ/NA, wherein a first array of pits is provided at a position which is shifted by a predetermined amount with respect to each track in one of two directions substantially perpendicular to the tracks, the first array of pits being formed with a predetermined pitch taking a value which is equal to or less than about λ/NA in a circumferential direction of the optical disk, and such that gaps exist between adjacent pits in the first array, wherein a second array of pits is provided at a position which is shifted by a predetermined amount with respect to the track in the other one of the two directions substantially perpendicular to the tracks, the second array of pits being formed with a predetermined pitch taking a value which is equal to or less than about λ/NA in a circumferential direction of the optical disk, and such that gaps exist between adjacent pits in the second array, wherein λ is a wavelength of a light beam which is radiated on the optical disk, and NA is a numerical aperture of a lens, wherein the predetermined pitch of the first array of pits is in the range of about 0.61 μm to about 0.667 μm;

wherein the predetermined pitch of the second array of pits is in the range of about 0.61 μm to about 0.667 μm;
wherein λ is about 425 nm; and
wherein NA is about 0.6.

10. An optical disk according to claim 1, wherein the pitch of the grooves is in the range of about λ/NA to about λ/NA×1.9.

11. An optical disk apparatus comprising:
a reproduction signal generation section for converging a light beam on an optical disk to reproduce information recorded on the optical disk,
the optical disk comprising tracks and grooves, the grooves being formed with a pitch equal to or greater than about λ/NA,
wherein a first array of pits is provided at a position which is shifted by a predetermined amount with respect to each track in one of two directions substantially perpendicular to the tracks, the first array of pits being formed with a predetermined pitch taking a value which is equal to or less than about λ/NA in a direction parallel to a circumference of the optical disk, and such that gaps exist between adjacent pits in the first array,
wherein a second array of pits is provided at a position which is shifted by a predetermined amount with respect to the track in the other one of the two directions substantially perpendicular to the tracks, the second array of pits being formed with a predetermined pitch taking a value which is equal to or less than about λ/NA in a direction parallel to a circumference of the optical disk, and such that gaps exist between adjacent pits in the second array, and
an off-tracking detection section for detecting an offset between the light beam and a center of the track, based on, among the information reproduced by the reproduction signal generation section, information concerning the first array of pits and the second array of pits;
wherein λ is a wavelength of a light beam which is radiated on the optical disk; and
NA is a numerical aperture of a lens.

12. An optical disk apparatus according to claim 11,
wherein the optical disk apparatus further comprises a tracking servo section for controlling the light beam so as to follow the track based on a tracking error signal indicating the offset between the light beam and the center of the track, and
wherein, based on the offset between the light beam and the center of the track as detected by the off-tracking detection section, the tracking servo section changes a target position of the light beam so that the light beam is located substantially at the center of the track.

13. An optical disk apparatus according to claim 11,
wherein the information concerning the first array of pits and the second array of pits is an amplitude of a reproduction signal from the first array of pits and an amplitude of a reproduction signal from the second array of pits as detected by the reproduction signal generation section, and
wherein the off-tracking detection section detects the offset between the light beam and the center of the track based on a difference between the amplitude of the reproduction signal from the first array of pits and the amplitude of the reproduction signal from the second array of pits.

14. An optical disk apparatus according to claim 11,
wherein the off-tracking detection section calculates an amplitude based on a difference between a value representing a peak envelope and a value representing a bottom envelope of a reproduction signal generated by the reproduction signal generation section, and
wherein the off-tracking detection section calculates a difference between an amplitude of a reproduction signal obtained by scanning the first array of pits with the light beam and an amplitude of a reproduction signal obtained by scanning the second array of pits with the light beam.

15. An optical disk apparatus comprising:
a reproduction signal generation section for converging a light beam on an optical disk to reproduce information recorded on the optical disk,
the optical disk comprising tracks and grooves, the grooves being formed with a pitch equal to or greater than about λ/NA,
wherein a first array of pits is provided at a position, which is shifted by a predetermined amount with respect to each track in one of two directions substantially perpendicular to the tracks, the first array of pits being formed with a predetermined pitch taking a value within a range from about 0 to about λ/NA in a circumferential direction of the optical disk,
wherein a second array of pits is provided at a position which is shifted by a predetermined amount with respect to the track in the other one of the two directions substantially perpendicular to the tracks, the second array of pits being formed with a predetermined pitch taking a value within the range from about 0 to about λ/NA in a circumferential direction of the optical disk, and
an off-tracking detection section for detecting an offset between the light beam and a center of the track, based on, among the information reproduced by the reproduction signal generation section, information concerning the first array of pits and the second array of pits:
wherein λ is a wavelength of a light beam which is radiated on the optical disk; and
NA is a numerical aperture of a lens,
wherein the off-tracking detection section calculates a peak envelope detection value difference and a bottom envelope detection value difference,
the peak envelope detection value difference being defined as a difference between a value representing a peak envelope of a reproduction signal obtained by scanning the first array of pits with the light beam and a value representing a peak envelope of a reproduction signal obtained by scanning the second array of pits with the light beam,
the bottom envelope detection value difference being defined as a difference between a value representing a bottom envelope of a reproduction signal obtained by scanning the first array of pits with the light beam and a value representing a bottom envelope of a reproduction signal obtained by scanning the second array of pits with the light beam, and
wherein the off-tracking detection section calculates a difference between the peak envelope detection value difference and the bottom envelope detection value difference.

16. An optical disk apparatus comprising:
a reproduction signal generation section for converging a light beam on an optical disk to reproduce information recorded on the optical disk,
the optical disk comprising tracks and grooves, the grooves being formed with a pitch equal to or greater than about λ/NA, wherein a first array of pits is provided at a position, which is shifted by a predetermined amount with respect to each track in one of two directions substantially perpendicular to the tracks, the first array of pits being formed with a predetermined pitch taking a value within a range from about 0 to about $\lambda/NA$ in a circumferential direction of the optical disk, wherein a second array of pits is provided at a position which is shifted by a predetermined amount with respect to the track in the other one of the two directions substantially perpendicular to the tracks, the second array of pits being formed with a predetermined pitch taking a value within the range from about 0 to about $\lambda/NA$ in a circumferential direction of the optical disk, and an off-tracking detection section for detecting an offset between the light beam and a center of the track, based on, among the information reproduced by the reproduction signal generation section, information concerning the first array of pits and the second array of pits:
  wherein $\lambda$ is a wavelength of a light beam which is radiated on the optical disk; and
  NA is a numerical aperture of a lens,
  wherein the off-tracking detection section calculates an amplitude based on a difference between a value representing a peak envelope and a value representing a bottom envelope of a reproduction signal generated by the reproduction signal generation section, and
  wherein the off-tracking detection section calculates a difference between an amplitude of a reproduction signal obtained by scanning the first array of pits with the light beam and an amplitude of a reproduction signal obtained by scanning the second array of pits with the light beam,
the optical disk apparatus further comprising an address region detection section for generating a signal indicating that the light beam is located on an address region on the optical disk, based on the reproduction signal produced by the reproduction signal generation section,
wherein, based on the signal indicating that the light beam is located on the address region on the optical disk, the address region detection section generates a timing with which to detect the offset between the light beam and the center of the track while the light beam is scanning over a preceding one of the first array of pits and the second array of pits.

17. An optical disk apparatus comprising:

a reproduction signal generation section for converging a light beam on an optical disk to reproduce information recorded on the optical disk, the optical disk comprising tracks and grooves, the grooves being formed with a pitch equal to or greater than about $\lambda/NA$, wherein a first array of pits is provided at a position, which is shifted by a predetermined amount with respect to each track in one of two directions substantially perpendicular to the tracks, the first array of pits being formed with a predetermined pitch taking a value within a range from about 0 to about $\lambda/NA$ in a circumferential direction of the optical disk, wherein a second array of pits is provided at a position which is shifted by a predetermined amount with respect to the track in the other one of the two directions substantially perpendicular to the tracks, the second array of pits being formed with a predetermined pitch taking a value within the range from about 0 to about $\lambda/NA$ in a circumferential direction of the optical disk, and an off-tracking detection section for detecting an offset between the light beam and a center of the track, based on, among the information reproduced by the reproduction signal generation section, information concerning the first array of pits and the second array of pits:
  wherein $\lambda$ is a wavelength of a light beam which is radiated on the optical disk; and
  NA is a numerical aperture of a lens,
  wherein the off-tracking detection section calculates an amplitude based on a difference between a value representing a peak envelope and a value representing a bottom envelope of a reproduction signal generated by the reproduction signal generation section, and
  wherein the off-tracking detection section calculates a difference between an amplitude of a reproduction signal obtained by scanning the first array of pits with the light beam and an amplitude of a reproduction signal obtained by scanning the second array of pits with the light beam,
the optical disk apparatus further comprising an address region detection section for generating a signal indicating that the light beam is located on an address region on the optical disk, based on the reproduction signal produced by the reproduction signal generation section,
wherein, based on the signal indicating that the light beam is located on the address region on the optical disk, the address region detection section generates a timing with which to detect the offset between the light beam and the center of the track while the light beam is scanning over a subsequent one of the first array of pits and the second array of pits.

18. An optical disk apparatus comprising:

a reproduction signal generation section for converging a light beam on an optical disk to reproduce information recorded on the optical disk, the optical disk comprising tracks and grooves, the grooves being formed with a pitch equal to or greater than about $\lambda/NA$, wherein a first array of pits is provided at a position, which is shifted by a predetermined amount with respect to each track in one of two directions substantially perpendicular to the tracks, the first array of pits being formed with a predetermined pitch taking a value within a range from about 0 to about $\lambda/NA$ in a circumferential direction of the optical disk, wherein a second array of pits is provided at a position which is shifted by a predetermined amount with respect to the track in the other one of the two directions substantially perpendicular to the tracks, the second array of pits being formed with a predetermined pitch taking a value within the range from about 0 to about $\lambda/NA$ in a circumferential direction of the optical disk, and an off-tracking detection section for detecting an offset between the light beam and a center of the track, based on, among the information reproduced by the reproduction signal generation section, information concerning the first array of pits and the second array of pits:
  wherein $\lambda$ is a wavelength of a light beam which is radiated on the optical disk; and NA is a numerical aperture of a lens, wherein the off-tracking detection section calculates an amplitude based on a difference between a value representing a peak envelope and a value representing a bottom envelope of a reproduction signal generated by the reproduction signal generation section, and wherein the off-tracking detection section calculates a difference between an amplitude of a reproduction signal obtained by scanning the first array of pits with the light beam and an amplitude of a reproduction signal obtained by scanning the second array of pits with the light beam, wherein the off-tracking detection section detects the offset between the light beam and the center of the track by use of the light beam scanning over the first array of pits and the second array of pits, and wherein the off-tracking detection section detects the offset holds a previously detected value until a subsequent time the light beam scans over the first array of pits and the second array of pits.

19. An optical disk apparatus according to claim 15, further comprising an address region detection section for generating a signal indicating that the light beam is located on an address region on the optical disk, based on the reproduction signal produced by the reproduction signal generation section, wherein, based on the signal indicating that the light beam is located on the address region on the optical disk, the address region detection section generates a timing with which to detect the offset between the light beam and the center of the track while the light beam is scanning over a preceding one of the first array of pits and the second array of pits.

20. An optical disk apparatus according to claim 15, further comprising an address region detection section for generating a signal indicating that the light beam is located on an address region on the optical disk, based on the reproduction signal produced by the reproduction signal generation section, wherein, based on the signal indicating that the light beam is located on the address region on the optical disk, the address region detection section generates a timing with which to detect the offset between the light beam and the center of the track while the light beam is scanning over a subsequent one of the first array of pits and the second array of pits.

21. An optical disk apparatus according to claim 15, wherein the off-tracking detection section detects the offset between the light beam and the center of the track by use of the light beam scanning over the first array of pits and the second array of pits, and wherein the off-tracking detection section detects the offset holds a previously detected value until a subsequent time the light beam scans over the first array of pits and the second array of pits.

22. An optical disk apparatus according to claim 11, further comprising a tracking servo section for controlling the light beam so as to be located substantially at the center of the track, based an the offset detected by the off-tracking detection section.

23. An optical disk comprising tracks and grooves, the grooves being formed with a pitch equal to or greater than about $\lambda/NA$, wherein a first array of pits is provided at a position which is shifted by a predetermined amount with respect to each track in one of two directions substantially perpendicular to the tracks, the first array of pits being formed with a predetermined pitch, where the predetermined pitch is a function of a pitch of the grooves taking a value within a range from about 0 to about $\lambda/NA$, wherein a second array of pits is provided at a position which is shifted by a predetermined amount with respect to the track in the other one of the two directions substantially perpendicular to the tracks, the second array of pits being formed with a predetermined pitch, where the predetermined pitch is a function of a pitch of the grooves taking a value within the range from about 0 to about $\lambda/NA$, wherein $\lambda$ is a wavelength of a light beam which is radiated on the optical disk; and NA is a numerical aperture of a lens, wherein a reproduction time of a pit in the first array of pits is n times as large as a reproduction clock cycle, wherein a reproduction time of a pit in the second array of pits is n times as large as the reproduction clock cycle, wherein a reproduction time of a space between adjoining pits in the first array of pits is m times as large as the reproduction clock cycle, wherein a reproduction time of a space between adjoining pits in the second array of pits is m times as large as the reproduction clock cycle, where n and m are natural numbers, and wherein n is 3 and m is 4.

24. An optical disk comprising tracks and grooves, the grooves being formed with a pitch equal to or greater than about $\lambda/NA$, wherein a first array of pits is provided at a position which is shifted by a predetermined amount with respect to each track in one of two directions substantially perpendicular to the tracks, the first array of pits being formed with a predetermined pitch, where the predetermined pitch is a function of a pitch of the grooves taking a value within a range from about 0 to about $\lambda/NA$, wherein a second array of pits is provided at a position which is shifted by a predetermined amount with respect to the track in the other one of the two directions substantially perpendicular to the tracks, the second array of pits being formed with a predetermined pitch, where the predetermined pitch is a function of a pitch of the grooves taking a value within the range from about 0 to about $\lambda/NA$, wherein $\lambda$ is a wavelength of a light beam which is radiated on the optical disk; and NA is a numerical aperture of a lens, wherein a reproduction time of a pit in the first array of pits is n times as large as a reproduction clock cycle, wherein a reproduction time of a pit in the second array of pits is n times as large as the reproduction clock cycle, wherein a reproduction time of a space between adjoining pits in the first array of pits is m times as large as the reproduction clock cycle, wherein a reproduction time of a space between adjoining pits in the second array of pits is m times as large as the reproduction clock cycle, where n and m are natural numbers, and wherein n is 4 and m is 3.

25. An optical disk apparatus comprising:

a reproduction signal generation section for converging a light beam on an optical disk to reproduce information recorded on the optical disk, the optical disk comprising tracks and grooves, the grooves being formed with a pitch equal to or greater than about $\lambda/NA$, wherein a first array of pits is provided at a position which is shifted by a predetermined amount with respect to each track in one of two directions substantially perpendicular to the tracks, the first array of pits being formed with a predetermined pitch, where the predetermined pitch is a function of a pitch of the grooves taking a value within a range from about 0 to about $\lambda/NA$, wherein a second array of pits is provided at a position which is shifted by a predetermined amount with respect to the track in the other one of the two directions substantially perpendicular to the tracks, the second array of pits being formed with a predetermined pitch, where the predetermined pitch is a function of the pitch of the grooves taking a value within the range from about 0 to about $\lambda/NA$, and an off-tracking detection section for detecting an offset between the light beam and a center of the track, based on, among the information reproduced by the reproduction signal generation section, information concerning the first array of pits and the second array of pits;

wherein $\lambda$ is a wavelength of a light beam which is radiated on the optical disk; and NA is a numerical aperture of a lens, wherein the off-tracking detection section calculates an amplitude based on a difference between a value representing a peak envelope and a value representing a bottom envelope of a reproduction signal generated by the reproduction signal generation section, and wherein the off-tracking detecting section calculates a difference between an amplitude of a reproduction signal obtained by scanning the first array of pits with the light beam and an amplitude of a reproduction signal obtained by scanning the second array of pits with the light beam, the optical disk apparatus further comprising an address region detection section for generating a signal indicating that the light beam is located on an address region on the optical disk, based on the reproduction signal produced by the reproduction signal generation section, wherein, based on the signal indicating that the light beam is located on the address region on the optical disk, the address region detection section generates a timing with which to detect the offset between the light beam and the center of the track while the light beam is scanning over a preceding one of the first array of pits and the second array of pits.

26. An optical disk apparatus comprising:

a reproduction signal generation section for converging a light beam on an optical disk to reproduce information recorded on the optical disk, the optical disk comprising tracks and grooves, the grooves being formed with a pitch equal to or greater than about $\lambda/NA$, wherein a first array of pits is provided at a position which is shifted by a predetermined amount with respect to each track in one of two directions substantially perpendicular to the tracks, the first array of pits being formed with a predetermined pitch, where the predetermined pitch is a function of a pitch of the grooves taking a value within a range from about 0 to about $\lambda/NA$, wherein a second array of pits is provided at a position which is shifted by a predetermined amount with respect to the track in the other one of the two directions substantially perpendicular to the tracks, the second array of pits being formed with a predetermined pitch, where the predetermined pitch is a function of the pitch of the grooves taking a value within the range from about 0 to about $\lambda/NA$, and an off-tracking detection section for detecting an offset between the light beam and a center of the track, based on, among the information reproduced by the reproduction signal generation section, information concerning the first array of pits and the second array of pits;

wherein $\lambda$ is a wavelength of a light beam which is radiated on the optical disk; and NA is a numerical aperture of a lens, wherein the off-tracking detection section calculates an amplitude based on a difference between a value representing a peak envelope and a value representing a bottom envelope of a reproduction signal generated by the reproduction signal generation section, and wherein the off-tracking detecting section calculates a difference between an amplitude of a reproduction signal obtained by scanning the first array of pits with the light beam and an amplitude of a reproduction signal obtained by scanning the second array of pits with the light beam, the optical disk apparatus further comprising an address region detection section for generating a signal indicating that the light beam is located on an address region on the optical disk, based on the reproduction signal produced by the reproduction signal generation section, wherein, based on the signal indicating that the light beam is located on the address region on the optical disk, the address region detection section generates a timing with which to detect the offset between the light beam and the center of the track while the light beam is scanning over a subsequent one of the first array of pits and the second array of pits.

27. An optical disk apparatus comprising:

a reproduction signal generation section for converging a light beam on an optical disk to reproduce information recorded on the optical disk, the optical disk comprising tracks and grooves, the grooves being formed with a pitch equal to or greater than about $\lambda/NA$, wherein a first array of pits is provided at a position which is shifted by a predetermined amount with respect to each track in one of two directions substantially perpendicular to the tracks, the first array of pits being formed with a predetermined pitch, where the predetermined pitch is a function of a pitch of the grooves taking a value within a range from about 0 to about $\lambda/NA$, wherein a second array of pits is provided at a position which is shifted by a predetermined amount with respect to the track in the other one of the two directions substantially perpendicular to the tracks, the second array of pits being formed with a predetermined pitch, where the predetermined pitch is a function of the pitch of the grooves taking a value within the range from about 0 to about $\lambda$/NA, and an off-tracking detection section for detecting an offset between the light beam and a center of the track, based on, among the information reproduced by the reproduction signal generation section, information concerning the first array of pits and the second array of pits;

wherein $\lambda$ is a wavelength of a light beam which is radiated on the optical disk; and NA is a numerical aperture of a lens, wherein the off-tracking detection section calculates an amplitude based on a difference between a value representing a peak envelope and a value representing a bottom envelope of a reproduction signal generated by the reproduction signal generation section, and wherein the off-tracking detection section calculates a difference between an amplitude of a reproduction signal obtained by scanning the first array of pits with the light beam and an amplitude of a reproduction signal obtained by scanning the second array of pits with the light beam, wherein the off-tracking detection section detects the offset between the light beam and the center of the track by use of the light beam scanning over the first array of pits and the second array of pits, and wherein the off-tracking detection section detects the offset holds a previously detected value until a subsequent time the light beam scans over the first array of pits and the second array of pits.

28. An optical disk apparatus comprising:

a reproduction signal generation section for converging a light beam on an optical disk to reproduce information recorded on the optical disk, the optical disk comprising tracks and grooves, the grooves being formed with a pitch equal to or greater than about $\lambda$/NA, wherein a first array of pits is provided at a position which is shifted by a predetermined amount with respect to each track in one of two directions substantially perpendicular to the tracks, the first array of pits being formed with a predetermined pitch, where the predetermined pitch is a function of a pitch of the grooves taking a value within a range from about 0 to about $\lambda$/NA, wherein a second array of pits is provided at a position which is shifted by a predetermined amount with respect to the track in the other one of the two directions substantially perpendicular to the tracks, the second array of pits being formed with a predetermined pitch, where the predetermined pitch is a function of the pitch of the grooves taking a value within the range from about 0 to about $\lambda$/NA, and an off-tracking detection section for detecting an offset between the light beam and a center of the track, based on, among the information reproduced by the reproduction signal generation section, information concerning the first array of pits and the second array of pits;

wherein $\lambda$ is a wavelength of a light beam which is radiated on the optical disk; and NA is a numerical aperture of a lens, wherein the off-tracking detection section calculates a peak envelope detection value difference and a bottom envelope detection value difference, the peak envelope detection value difference being defined as a difference between a value representing a peak envelope of a reproduction signal obtained by scanning the first array of pits with the light beam and a value representing a peak envelope of a reproduction signal obtained by scanning the second array of pits with the light beam, the bottom envelope detection value difference being defined as a difference between a value representing a bottom envelope of a reproduction signal obtained by scanning the first array of pits with the light beam and a value representing a bottom envelope of a reproduction signal obtained by scanning the second array of pits with the light beam, and wherein the off-tracking detection section calculates a difference between the peak envelope detection value difference and the bottom envelope detection value difference.

29. An optical disk apparatus according to claim 28, further comprising an address region detection section for generating a signal indicating that the light beam is located on an address region on the optical disk, based on the reproduction signal produced by the reproduction signal generation section, wherein, based on the signal indicating that the light beam is located on the address region on the optical disk, the address region detection section generates a timing with which to detect the offset between the light beam and the center of the track while the light beam is scanning over a preceding one of the first array of pits and the second array of pits.

30. An optical disk apparatus according to claim 28, further comprising an address region detection section for generating a signal indicating that the light beam is located on an address region on the optical disk, based on the reproduction signal produced by the reproduction signal generation section, wherein, based on the signal indicating that the light beam is located on the address region on the optical disk, the address region detection section generates a timing with which to detect the offset between the light beam and the center of the track while the light beam is scanning over a subsequent one of the first array of pits and the second array of pits.

31. An optical disk apparatus according to claim 28, wherein the off-tracking detection section detects the offset between the light beam and the center of the track by use of the light beam scanning over the first array of pits and the second array of pits, and wherein the off-tracking detection section detects the offset holds a previously detected value until a subsequent time the light beam scans over the first array of pits and the second array of pits.

* * * * *

UNITED STATES PATENT AND TRADEMARK OFFICE
CERTIFICATE OF CORRECTION

PATENT NO.     : 6,567,372 B2
DATED          : May 20, 2003
INVENTOR(S)    : Kouichi Takamine et al.

It is certified that error appears in the above-identified patent and that said Letters Patent is hereby corrected as shown below:

Title page,
Item [56], References Cited, FOREIGN PATENT DOCUMENTS, please add:
-- JP 10-11762 1/1998 --

Signed and Sealed this

Fourth Day of November, 2003

JAMES E. ROGAN
*Director of the United States Patent and Trademark Office*